United States Patent
Fellows et al.

(10) Patent No.: US 12,556,555 B2
(45) Date of Patent: Feb. 17, 2026

(54) ARTIFICIAL INTELLIGENCE BASED CYBERSECURITY SYSTEM MONITORING TELECOMMUNICATIONS NETWORKS

(71) Applicant: Darktrace Holdings Limited, Cambridge (GB)

(72) Inventors: Simon Fellows, Cambridge (GB); Jack Pearson, Northumberland (GB)

(73) Assignee: Darktrace Holdings Limited, Cambridge (GB)

( * ) Notice: Subject to any disclaimer, the term of this patent is extended or adjusted under 35 U.S.C. 154(b) by 447 days.

(21) Appl. No.: 17/991,183

(22) Filed: Nov. 21, 2022

(65) Prior Publication Data

US 2023/0164567 A1 May 25, 2023

Related U.S. Application Data

(60) Provisional application No. 63/281,978, filed on Nov. 22, 2021.

(51) Int. Cl.
*H04L 9/40* (2022.01)
*H04L 41/16* (2022.01)
*H04W 12/122* (2021.01)

(52) U.S. Cl.
CPC .......... *H04L 63/1425* (2013.01); *H04L 41/16* (2013.01); *H04L 63/1408* (2013.01); *H04L 63/1416* (2013.01); *H04L 63/1441* (2013.01); *H04L 63/20* (2013.01); *H04W 12/122* (2021.01)

(58) Field of Classification Search
CPC . H04L 63/1425; H04L 41/16; H04L 63/1408; H04L 63/1416; H04L 63/1441; H04L 63/20; H04L 41/0654; H04L 41/147; H04L 63/1433; H04W 12/122
See application file for complete search history.

(56) References Cited

U.S. PATENT DOCUMENTS

| | | | | |
|---|---|---|---|---|
| 9,348,742 | B1* | 5/2016 | Brezinski | G06F 21/566 |
| 9,516,053 | B1* | 12/2016 | Muddu | G06F 16/9024 |
| 12,079,333 | B2* | 9/2024 | Karr | G06F 11/3485 |
| 12,153,670 | B2* | 11/2024 | Richardson | G06F 11/108 |
| 12,204,657 | B2* | 1/2025 | D'Souza | G06F 3/0608 |
| 2018/0234348 | A1* | 8/2018 | Goloubew | H04L 41/16 |

(Continued)

*Primary Examiner* — Dhaval V Patel
(74) *Attorney, Agent, or Firm* — Rutan and Tucker, LLP

(57) ABSTRACT

The cyber security appliance can include many AI models and modules working together including self-learning models that use unsupervised machine learning algorithms to model different entities in the telecommunications network via modelling their normal behavior and an assessment module. The assessment module can cooperate with the self-learning models that model the normal behavior of the communications and activities in the control plane and/or management plane in the telecommunications network in order to assess deviations in the control plane's/management plane's normal behavior to protect the telecommunications network from a cyber threat. The self-learning models can also use unsupervised machine learning algorithms to model the normal behavior of the communications and activities in the control plane and/or management plane in the telecommunications network in order to self-learn over time of an operation of the telecommunications network to and adjust and assist in determining what is normal and what is abnormal.

18 Claims, 9 Drawing Sheets

(56) References Cited

U.S. PATENT DOCUMENTS

| | | | | |
|---|---|---|---|---|
| 2019/0380037 A1* | 12/2019 | Lifshitz | ............... | H04L 41/14 |
| 2022/0385692 A1* | 12/2022 | Kacewicz | ........... | H04L 63/1425 |
| 2023/0161631 A1* | 5/2023 | Sharma | ............... | G06F 9/4856 |
| | | | | 718/104 |

* cited by examiner

ARTIFICIAL INTELLIGENCE BASED CYBERSECURITY SYSTEM MONITORING TELECOMMUNICATIONS NETWORKS

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

RELATED APPLICATION

This application claims priority under 35 USC 119 to U.S. provisional patent application No. 63/281,978, titled "CYBER SECURITY TOOLS TO PROTECT A SYSTEM" filed Nov. 22, 2021, which the disclosures of such are incorporated herein by reference in their entirety.

FIELD

Cyber security and in an embodiment use of Artificial Intelligence in cyber security involving a telecommunications network.

BACKGROUND

As networks have grown in scope and complexity, the opportunities for attackers to exploit the gaps have increased. Firewalls are no longer enough to protect the corporate networks spilling into home environments, and rules-based tools cannot keep up with all possible attack vectors, and cannot respond fast enough if a machine-speed attack hits. A constantly evolving cyber-attack landscape requires a step up in our detection capability, using machine learning to understand the environment, filter the noise and take action where threats are identified.

SUMMARY

Methods, systems, and apparatus are disclosed for an Artificial Intelligence based cyber security system. The Artificial Intelligence based cyber security system can include many AI models and modules working together including self-learning models configured to use unsupervised machine learning algorithms to model different entities in the telecommunications network via modelling their normal behavior and an assessment module. The assessment module can cooperate with the self-learning models that use unsupervised machine learning algorithms to model the normal behavior of the communications and activities in the control plane and/or management plane in the telecommunications network in order to assess deviations in the control plane's and/or management plane's ('control/management plane's') normal behavior to protect the telecommunications network from a cyber threat. The self-learning models utilise unsupervised machine learning algorithms to model the normal behavior of the communications and activities in the control plane and/or management plane in the telecommunications network in order to self-learn over time of an operation of the telecommunications network to adjust and assist in determining what is normal and what is abnormal. An autonomous response module can work with the assessment module when the cyber threat is detected and autonomously take actions to mitigate the cyber threat.

These and other features of the design provided herein can be better understood with reference to the drawings, description, and claims, all of which form the disclosure of this patent application.

DRAWINGS

The drawings refer to some embodiments of the design provided herein in which:

FIG. 1 illustrates a block diagram of an embodiment of the Artificial Intelligence based cyber security appliance with an assessment module cooperating with self-learning models that use unsupervised machine learning algorithms to model the normal behavior of the communications and activities in the control plane and the management plane in the telecommunications network in order to assess deviations in the control plane's normal behavior and management's plane's normal behavior to protect the telecommunications network from a cyber threat.

FIG. 2 illustrates a block diagram of an embodiment of a telecommunications network that includes the control plane and the management plane protected by a cyber security appliance.

FIG. 3 illustrates a block diagram of an embodiment of at least one of a control plane module and a management module configured to receive information from and send information to sensors located within components of the telecommunications network and to components, such as software agents acting as sensors, located outside of a control of the telecommunications network in microservices provided by a third party.

FIG. 4 illustrates a block diagram of an embodiment of at least one of a control plane module and a management plane configured to receive information from and send information to a software agent acting as a sensor located outside of a control of the telecommunications network in a container-orchestration system (e.g. microservice) operated by a third party to monitor communications and activities of one or more applications occurring in a same pod of the container-orchestration system.

FIG. 5 illustrates a block diagram of an embodiment of at least one of a control plane module and a management plane configured to receive information from and send information to a software agent acting as a sensor located outside of a control of the telecommunications network in a container-orchestration system (e.g. microservice) operated by a third party to monitor communications and activities of two or more applications occurring in a same pod of the container-orchestration system.

FIG. 6 illustrates a block diagram of an embodiment of at least one of a control plane module and a management plane configured to receive information from and send information to a software agent acting as a sensor located inside of a control of the telecommunications network in a container-orchestration system (e.g. microservice) to monitor communications and activities of one or more applications occurring in a same pod of the container-orchestration system.

Figure 1:
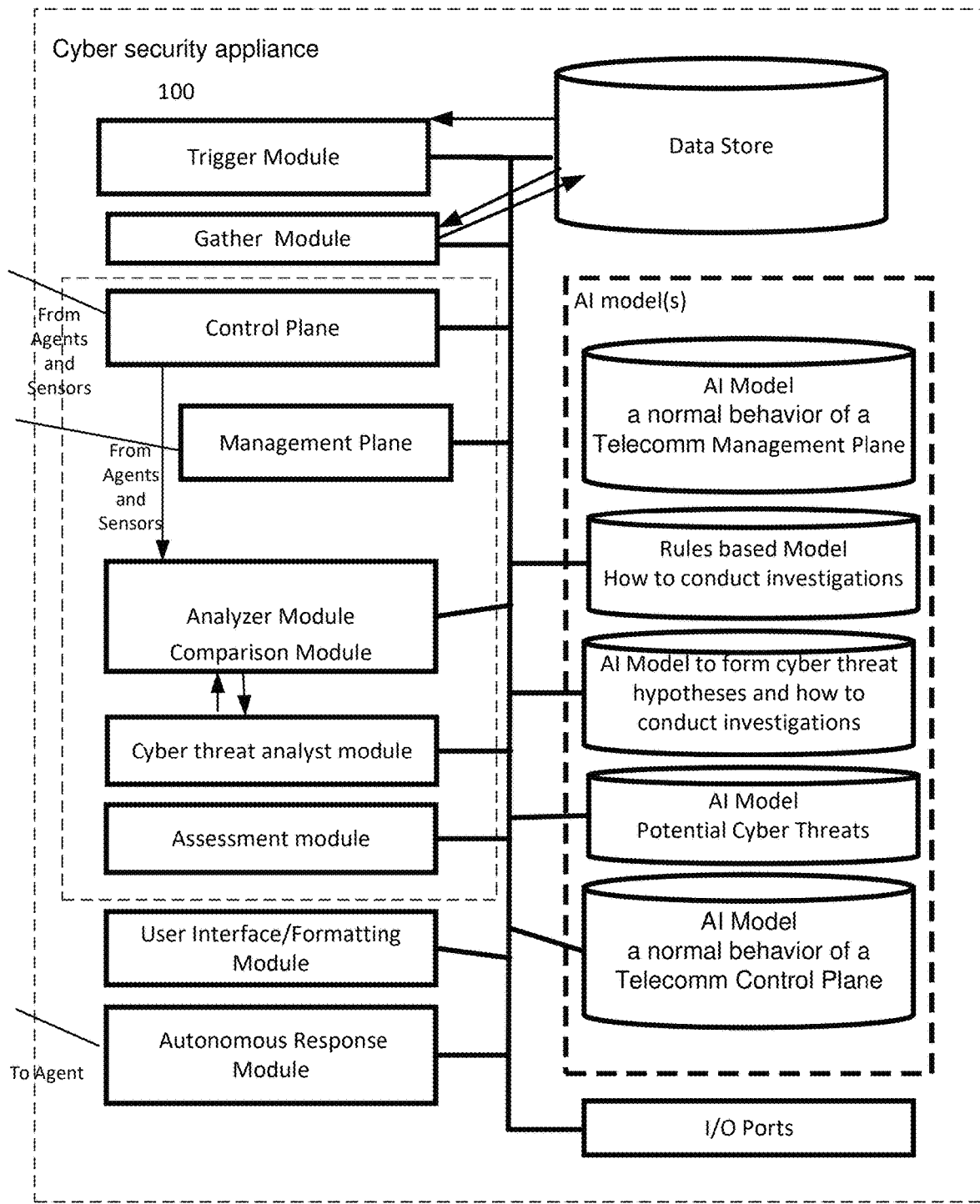

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

FIG. 1 illustrates a block diagram of an embodiment of the Artificial Intelligence based cyber security appliance with an assessment module cooperating with self-learning models that use unsupervised machine learning algorithms to model the normal behavior of the communications and activities in the control plane and the management plane in the telecommunications network in order to assess deviations in the control plane's normal behavior and management's plane's normal behavior to protect the telecommunications network from a cyber threat. The various Artificial Intelligence (AI) models and modules of the cyber security appliance 100 cooperate to protect telecommunications networks under analysis from cyber threats. The AI-based cyber security appliance 100 may include a trigger module, a gatherer module, an analyzer module, a cyber threat analyst module, an assessment module, a formatting module, one or more self-learning models that use unsupervised machine learning algorithms to model a normal behavior of at least a control plane and a management plane in the telecommunications network under analysis, one or more AI models trained with machine learning on cyber threat hypotheses to form and investigate a cyber threat hypothesis on what are a possible set of cyber threats and their characteristics, symptoms, remediations, etc., and one or more AI models trained on possible cyber threats and their characteristics and symptoms, a data store, an autonomous response module, a control plane module, a management plane module, and a coordinator module. Note, the Artificial Intelligence models can include i) the one or more self-learning models that use unsupervised machine learning algorithms to model a normal behavior, ii) the AI models trained with machine learning on how to form cyber threat hypotheses and how to conduct investigations for a cyber threat hypothesis, and iii) the AI models trained on possible cyber threats.

In an embodiment, the cyber security appliance 100 can protect all of the devices, user account privileges of administrators of the telecom network, for example, on an individual basis by monitoring activities and communications occurring in the network as well as receiving inputs from software agents embedded in pods of a container-orchestration system. The steps below will detail the activities and functions of several of the components in the cyber security appliance 100.

One or more self-learning models use unsupervised machine learning algorithms to model a control plane in a telecommunications network via modeling a normal behavior of the communications and activities in the control plane in the telecommunications network. Likewise for the management plane, one or more self-learning models use unsupervised machine learning algorithms to model a normal behavior of communications and activities in a management plane in the telecommunications network.

The assessment module cooperates with the other modules and Artificial Intelligence models to assess deviations in the management plane's normal behavior in the telecommunications network to protect the telecommunications network from the cyber threat. Likewise, the assessment module cooperates with the other modules and Artificial Intelligence models to assess deviations in the control plane's normal behavior in the telecommunications network to protect the telecommunications network from the cyber threat.

The self-learning models also use unsupervised machine learning algorithms to model the normal behavior of the communications and activities in the control plane in the telecommunications network in order to self-learn with the unsupervised machine learning algorithms over time of an operation of the telecommunications network to assist in determining what is normal and what is abnormal. Likewise, the self-learning models also use unsupervised machine learning algorithms to model the normal behavior of the communications and activities in the management plane in the telecommunications network in order to self-learn with the unsupervised machine learning algorithms over time of an operation of the telecommunications network to assist in determining what is normal and what is abnormal. Note, in an embodiment, the separate normal behavior modeling can help to keep detecting deviations more accurately with other changes in the control and management planes. The management plane includes standard IT network components implemented and incorporated into the telecommunications network with their higher rate of change. The control plane changes are slower as individual telecoms businesses have to interact with each other; and thus, generally have mutually agreed changes and equipment changes for the individual telecoms businesses in order to interact with each other.

The control plane module and the management plane module are configured to receive information from and send information to sensors located within the telecommunications network (and potentially outside the network) to monitor and collect information about the telecommunications network.

An AI classifier in the control plane module is configured to at least understand a format of packets formatted in one or more telecom network protocols including control plane protocols; and likewise, the AI classifiers in the management plane module similarly understand the management protocols. Note, the Telecomm stack is made up of different protocols and sometimes functions than an IT network stack or an OT network stack, and the Artificial Intelligence models and AI classifiers are configured to identify and understand those different protocols making up the telecom stack. (See FIG. 2 and its discussion)

AI classifiers in the control plane module, in the management plane module, and/or both are trained to perform a deep packet inspection on telecom packets in the telecommunications network to assist in determining a telecom packet's intention, routing information, and other information about the packet. In an example, the deep packet inspection performed factors a nature of the connections in telecom network protocols and an association that a telecom network device can have multiple connections inside of it and multiple IP addresses associated with that telecom network device. Again, the deep packet inspection and follow along AI classifier's analysis determines a telecom packet's intention and extra information about the telecom packet including its routing information.

Again, the control plane module and the management plane module are configured to receive information from and send information to sensors located within the telecommunications network to monitor and collect information, via at least performing a deep packet inspection on telecom packets in the telecommunications network, assessing device logs, configuration settings, events, etc. The control plane module and the management plane module can cooperate with the assessment module and the one or more AI models modeling normal behavior to perform AI anomaly detection on the respective control plane and management plane to detect the cyber threat and assess a threat level of each deviation from a normal behavior of that entity in the telecom network.

The AI classifiers can determine the intention of a telecom packet and other features including routing information by using two or more machine learning approaches such as combining supervised machine learning to classify telecom packet into different categories of packets with unsupervised machine learning. Additionally, the example AI classifier can use an unsupervised probabilistic Bayesian approach and uses features such as the type of communication, the endpoints of the connection, being the initiator and the receiver, time series data, the amount of data transferred, etc. to assist in analyzing and classifying the telecom data coming in and out of the management plane and the control plane of the telecommunications network. As discussed, in telecom routing information can be different than, for example, routing in a normal IT network. For example, multiple different IP addresses on different ports are generally multiple different devices in an IT network. However, in a telecoms network, a telecoms network device can have multiple connections inside of a single SCTP association and thus multiple IP addresses associated with that telecoms network device. A telecoms network device will also host many SCTP associations. Thus, the AI classifier will also look at associations in routing information for a given connection factoring in that a connection association for a single device can have an associated list of multiple IP addresses The cyber security appliance 100 with its self-learning models and modules cooperate to use behavior modeling specialized to i) the activity/processes' behavior of each device in that plane and ii) communications occurring within that plane. In the self-learning models modeling the management plane's and control plane's normal behavior, these AI models model by use of predominantly unsupervised machine learning algorithms that determine and analyze interesting features from the data set available in the management plane and control plane. The cyber security appliance 100 with its models and modules cooperating can use, for example, Bayesian techniques to establish a pattern of life feature for the communications and activities within each plane of the telecommunications network, which is a quite different pattern of life from traditional TCP/IP network systems. (See more discussion on AI training later)

The cyber security appliance 100 with its Artificial Intelligence models and modules cooperating can detect cyber threats (e.g. malicious actors) that are 1) trying to take over the telecom system impacting the control of components within the infrastructure, 2) trying to degrade the telecom system impacting availability via, for example, interfering with/disrupting the transmission of the data within the system, and 3) trying to spy/collect data on the telecom infrastructure; and thus, impact integrity. In an example, the assessment module and the self-learning models modeling the normal behavior cooperate to look for spying activities by observing, for example, abnormal data being communicated to, for example, routing addresses outside of the telecom network. The assessment and formatting modules then cooperate to communicate and flag that this is not normal activity and should be investigated and potentially have an autonomous action taken to mitigate this potential cyber threat.

In another example, the assessment module and models modeling the normal behavior look for degrading attacks, for example, denial of service-type attacks when detecting for degrading attacks affecting/compromising capabilities of network devices.

Figure 2:
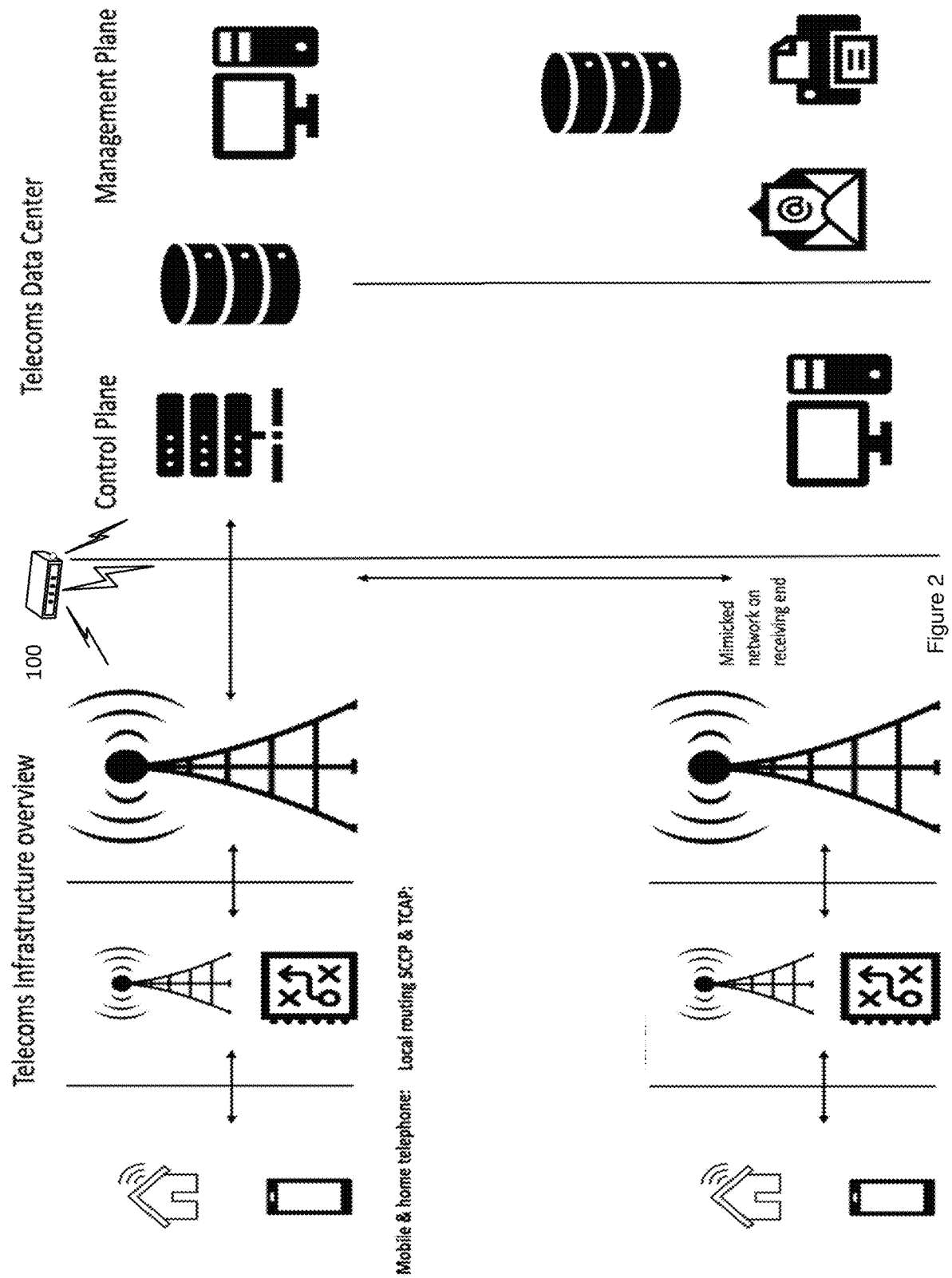

FIG. 2 illustrates a block diagram of an embodiment of a telecommunications network that includes the control plane and the management plane protected by a cyber security appliance. The telecommunications network can include the control plane, a user/data plane, and the management plane. The telecommunications network can also include a Sigtran adaptation layer, a local routing SCCP & TCAP portion of the network, and a mobile and home telephone portion of the network.

Again, the telecommunications network architecture can include the data/user plane, the control plane, and the management plane. Each plane can be thought of as different areas of operations. Each plane carries a different type of traffic and is conceptually (and often in reality) an overlay network (a network that runs independently on top of another one, although supported by its infrastructure).

The data/user plane carries the network users' traffic. The control plane carries control information (also known as signaling traffic). The control plane can include functions and processes that determine which path to use (such as LDP, Routing protocols, etc.) The management plane carries administrative and management traffic and allows administrative activities. In an example telecommunications network, all three planes can be implemented in the firmware of the infrastructure equipment such as routers and switches in the telecommunications network.

Again, the control plane module and other components are configured to understand the processes and communication aspects of the control plane as well as cooperate with the sensors to obtain this information. The control plane activities can include how telecom packets are routed from one place to another (e.g. creating a routing table, controlling roaming mechanisms, client load balancing of traffic, routing telecom packets between multiple access points, etc.). The control plane can be used for efficient routing through the infrastructure via Sigtran and SCCP control commands. The control plane can be situated around the Sigtran Adaptation layer and includes the national infrastructure level. The control plane has visibility of, for example, the whole Stream Control Transmission Protocol SCTP stack in the transport layer.

Again, the management plane module and other components are configured to understand the processes and communication aspects of the control plane as well as cooperate with the sensors to obtain this information. The management plane is used to manage devices and carries administrative traffic. The management plane can include the functions a telecommunications entity uses to control and monitor devices. Management plane can include functions used to control and monitor devices such as Wireless LAN configurations, configurations of SSIDS (network's names), power settings, etc. The management plane can manage network user databasing with all of the typical, IT network systems. Thus, for example, the printers, email servers, domain controllers, etc.

Next, an infrastructure of a telecommunications network includes aspects of the management layer and the control layer including the Sigtran adaptation layer, the local routing SCCP & TCAP, as well as the mobile and home telephones. Each member in the telecommunications community is going to be monitoring their telecommunications network making up a portion of the national telecommunications infrastructure that they are responsible for.

The Sigtran adaptation layer in the telecommunications network includes routing to infrastructures of other national or international telecommunications networks as well as translation for different national infrastructures between different versions of infrastructures, for example, phone line to radio networks, etc. This can be seen, for example, in the Sigtran adaptation later retrofitting the more modern MTP3 on top of M2AU or M2PA. Again, the Sigtran adaptation layer in the telecommunications network is used to route telecom packet information in between different countries, or in a large country between different larger sections of a country such as England to Scotland. This infrastructure of another telecommunications network can be mimicked on the receiving end in a different country and/or a portion of a large country.

The Sigtran adaptation layer is also used to route telecom packet information to the local routing SCCP and TCAP layer. The local routing SCCP and TCAP in the telecommunications network can be responsible for lower level local routing within counties or segments of cities. The local routing SCCP and TCAP can manage TCAP sessions. The local routing SCCP and TCAP can control commands via SCCP to the devices involved at this stage in the network.

The local routing SCCP and TCAP portion of the network can route telecom packet information to the mobile and home telephone portion of the network. Each of these telecom communications to the smaller local infrastructure has a TCAP session. The mobile and home telephone can route and control texts, phone calls, mobile data transfers, etc., which would be carried under a TCAP session via CAP, MAP, INAP, etc.

All of this information for the telecommunications network is sent by sensors in the telecom network to the modules and models inside the cyber security appliance including a number of AI classifiers in the control plane module and/or the management module to assist in both identifying the type of information, and other information found in the telecom information such as whether it's going between different countries, which adaptation layers are being used, which control commands are being used to route through national and international infrastructure, and including meta-data, etc. The AI classifier in the control plane module and/or the management module, the AI classifier classifies the data into identifying different features on the data. This analysis can help determine an intention of that telecom packet.

The one or more AI classifiers take a telecom packet and log its intention or its action, or what is responsible for doing at a higher level. For example, an AI classifier for the control plane could classify the infrastructure management/control intention, e.g. is responsible for rerouting, turning on and off a component in the telecommunications infrastructure, etc. The AI classifiers also pull out features of what is happening by monitoring the telecom information, what the activity means, etc. and those features are what can be compared against the models that use unsupervised machine learning algorithms to model a normal behavior so that the assessment module, the control plane module, the trigger module, and/or the management plane module can then point out things that seem like they do not fit in and might be threatening.

Some Additional Details on the Machine Learning

The Artificial Intelligence models and AI classifiers in the cyber security appliance 100 can combine the use of unsupervised and supervised machine learning. This cyber threat detection and response AI technology is powered by multiple machine learning approaches, which operate in combination to power the AI-based cyber security appliance 100. The AI-based cyber security appliance 100 plugs into the telecom network including any services and uses sensors to collect the data and interactions within the environment that the AI ingests and analyzes, and the self-learning models configured to use unsupervised machine learning algorithms to model form an understanding of the normal behavior of that telecom environment including the control plane and management plane, right down to the granular details of specific administrative operators of the telecom network, communications within the network, and activities by and processes with the network devices, using unsupervised machine learning. The self-learning models configured to model normal behavior continually revise their understanding about 'what is normal' based on evolving evidence over an operation of network devices and administrative operators in the telecom network under analysis. In an embodiment, each plane in the telecommunications network has its own self-learning models configured to use unsupervised machine learning algorithms to model the plane (management plane, control plane, etc.) in a telecommunications network via modeling a normal behavior of the communications and activities in that plane in the telecommunications network.

This evolving understanding of normal means that the AI can identify, with a high degree of precision, events or behaviors that are anomalous (e.g. deviations from the normal pattern of life by a threshold amount), and are unlikely to be benign. The ability to identify highly subtle activity that represents the first footprints of a cyber threat's attack, without any prior knowledge or intelligence, lies at the heart of the AI model's efficacy in keeping pace with cyber threat actors including an advanced persistent threat that activity tries to avoid detection.

In an embodiment, one set of Artificial Intelligence models and AI classifiers use machine learning to understand a view the "control plane" of the telecommunications network rather than "user plane" data or "management plane". This means the Artificial Intelligence models and classifiers use machine learning to understand how the telecom provider controls user data movements rather than monitoring the user data itself. Another set of Artificial Intelligence models and AI classifiers use unsupervised machine learning algorithms to understand a view the "management plane" of the telecommunications network rather than "user plane" data or "control plane".

Accordingly, in examples, the Artificial Intelligence models and the AI classifiers in the cyber security application can be configured and trained to understand and protect existing telecommunications infrastructures (e.g. 5G, 4G, broadband cellular network technology) and their respective management planes and control planes. Thus, the AI models and AI classifiers are configured and trained to understand each of the devices in the telecommunications infrastructure as well as the different protocols being processed in the respective 4G and/or 5G infrastructure. For example, the AI models and AI classifiers can be trained to understand telecoms transport protocols, such as Stream Control Transmission Protocol (SCTP), which is an example computer networking communications protocol in the transport layer of the Internet Protocol Suite. Likewise, the SIGTRAN family and related protocols are another of the telecom application protocols that the AI models and AI classifiers are trained to understand. The SIGTRAN family includes specifications for a family of protocols that provide reliable datagram service and user layer adaptations for Signaling System and ISDN communications protocols. Extensions to telecoms processes are also 'telecoms application protocols' that the AI models and AI classifiers are trained to understand. In addition, the AI models and AI classifiers are trained to understand telecoms authentication protocols extensions to the telecoms application protocols, such as Diameter. The AI models and AI classifiers are trained to understand each of the specific metrics for telecom activities. The AI models and AI classifiers are trained to understand the operation of each of the specific device types in the telecommunications network.

Figure 7:
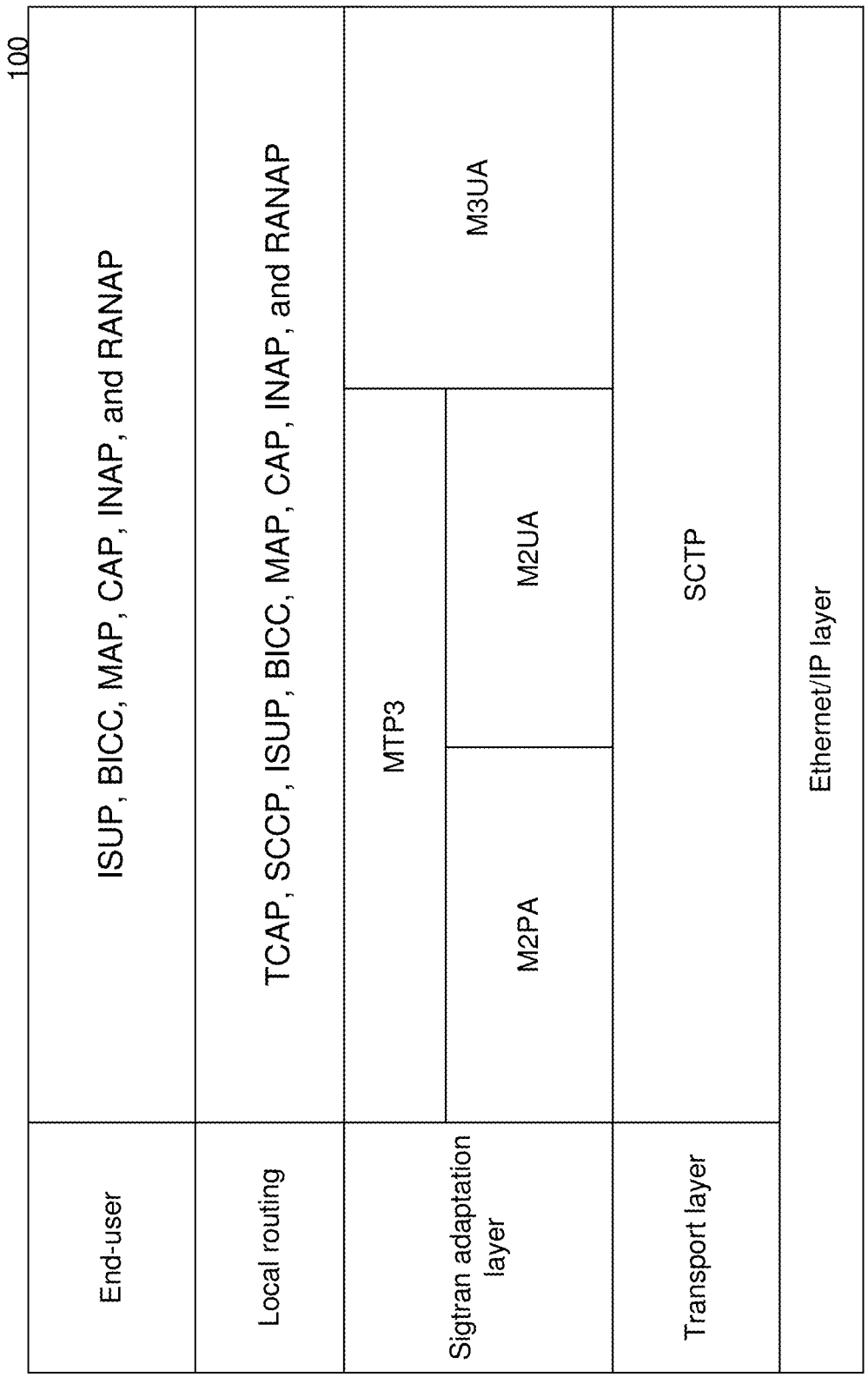
FIG. 7 illustrates a block diagram of an embodiment of possible telecommunications stack.

As shown in FIG. 7, the telecommunications stack can include the SIGTRAN protocols. Note, Sigtran can include a family of protocols that provide reliable datagram service and user layer adaptations for the Signaling System and ISDN communications protocols. The SIGTRAN family of protocols can include: Stream Control Transmission Protocol (SCTP), Message Transfer Part 2 (MTP), User Peer-to-Peer Adaptation Layer (M2PA), Message Transfer Part 2 User Adaptation Layer (M2UA), Message Transfer Part 3 User Adaptation Layer (M3UA), Signaling Connection Control Part (SCCP), etc.

The telecommunications stack can include the end-user, local routing, Sigtran adaptation layer, transport layer, and ethernet/IP layer. The transportation layer can include SCTP. The Sigtran adaptation layer can include MTP3 on top of M2AU or M2PA, and M3UA. The local routing can include Transaction Capabilities Application Part (TCAP), SCCP, as well as individual ISUP, BICC, MAP, CAP, INAP, and RANAP. The end user layer can include individual—ISDN user part (ISUP) protocol, Bearer Independent Call Control (BICC), MAP, CAP, INAP, and RANAP.

More on Modules and AI Model Interactions in the Cyber Security Appliance

Referring to FIG. 1, a data gather module may have a series of one or more process identifier classifiers. A process identifier classifier can identify and track each process and device in the network, under analysis, making communication connections. A data store cooperates with the process identifier classifier to collect and maintain historical data of processes and their connections, which is updated over time as the network is in operation. In an example, the process identifier classifier can identify each process running on a given device along with its endpoint connections, which are stored in the data store. In addition, a feature classifier can examine and determine features in the data being analyzed into different categories.

An analyzer module can cooperate with other modules and AI models in the cyber security appliance 100 to confirm a presence of a cyber threat attacking the telecommunications network in an organization's system. A cyber threat analyst module can cooperate with the other modules and AI models in the cyber security appliance 100 to conduct a long term investigation and/or a more in-depth investigation on potential cyber threats attacking one or more domains in an organization's system. An algorithm in the analyzer module can cooperate with the data gatherer module to collect any additional data and metrics to support a possible cyber threat hypothesis. The analyzer module and/or the cyber threat analyst module can also look for other anomalies, such as model breaches, including, for example, deviations from a normal behavior of an entity, and other techniques discussed herein. The analyzer module and/or the cyber threat analyst module can cooperate with the AI models trained on potential cyber threats in order to assist in examining and factoring these additional data points that have occurred over a given timeframe to see if a correlation exists between 1) a series of two or more anomalies occurring within that time frame and 2) possible known and unknown cyber threats. The cyber threat analyst module can cooperate with the internal data sources as well as external data sources to collect data in its investigation.

The cyber threat analyst module in essence allows two levels of investigations of potential cyber threat attacks. In a first level, the analyzer module and AI models can rapidly detect and then autonomously respond to overt and obvious cyber threat attacks. However, thousands to millions of low level anomalies occur in a domain under analysis all of the time; and thus, most other systems need to set the threshold of trying to detect a cyber threat attack at a level higher than the low level anomalies examined by the cyber threat analyst module just to not have too many false positive indications of a cyber threat attack when one is not actually occurring, as well as to not overwhelm a human cyber analyst receiving the alerts with so many notifications of low level anomalies that they just start tuning out those alerts. However, advanced persistent threats such as cyber threats attempt to avoid detection by making these low level anomalies in the system over time during their cyberattack before making their final coup de grace/ultimate mortal blow against the system being protected. The cyber threat analyst module also conducts a second level of investigations over time with the assistance of the AI models trained with machine learning on how to form cyber threat hypotheses and how to conduct investigations for a cyber threat hypothesis that can detect these advanced persistent cyber threats actively trying to avoid detection by looking at one or more of these low level anomalies as a part of a chain of linked information.

Note, a data analysis process can be algorithms/scripts written by humans to perform their function discussed herein; and, can in various cases use AI classifiers as part of their operation. The cyber threat analyst module forms in conjunction with the AI models trained with machine learning on how to form cyber threat hypotheses and how to conduct investigations for a cyber threat hypothesis investigate hypotheses on what are a possible set of cyber threats.

They can also cooperate with the analyzer module with its one or more data analysis processes to conduct an investigation on a possible set of cyber threats hypotheses that would include an anomaly of at least one of i) the abnormal behavior, ii) the suspicious activity, and iii) any combination of both, identified through cooperation with, for example, the one or more AI models trained with machine learning on the normal pattern of life of entities in the system. (For example, see FIG. 8, the cyber threat analyst module will perform several additional rounds of gathering additional information including abnormal behavior over a period of time, in this example, examining data over a 7 day period to determine causal links between the information.) For example, causal links between a series of management plane activities and communications with a set of control plane activities. The cyber threat analyst module will submit to check and recheck various combinations/a chain of potentially related information under analysis until each of the one or more hypotheses on potential cyber threats are one of 1) refuted, 2) supported, or 3) included in a report that includes details of activities assessed to be relevant activities to the anomaly of interest to the administrators of the telecom network and that also conveys at least this particular hypothesis was neither supported or refuted; and thus, needs a human to further investigate the anomaly of interest included in the chain of potentially related information.

Again, an input from the cyber threat analyst module of a supported hypothesis of a potential cyber threat will trigger the analyzer module to compare, confirm, and send a signal to act upon and mitigate that cyber threat. In contrast, the cyber threat analyst module investigates subtle indicators and/or initially seemingly isolated unusual or suspicious activity such as a worker is logging in after their normal working hours, a new set of activities is being performed by an administrator and/or a network device, a simple system misconfiguration has occurred, etc. Most of the investigations conducted by the cyber threat analyst module cooperating with the AI models trained with machine learning on how to form cyber threat hypotheses and how to conduct investigations for a cyber threat hypothesis on unusual or suspicious activities/behavior may not result in a cyber threat hypothesis that is supported but rather most are refuted or simply not supported. Typically during the investigations, several rounds of data gathering to support or refute the long list of potential cyber threat hypotheses formed by the cyber threat analyst module will occur before the algorithms in the cyber threat analyst module will determine whether a particular cyber threat hypothesis is supported, refuted, or needs further investigation by a human. The rounds of data gathering will build chains of linked low level indicators of unusual activity along with potential activities that could be within a normal pattern of life for that entity to evaluate the whole chain of activities to support or refute each potential cyber threat hypothesis formed. (See again, for example, FIG. 8 and a chain of linked low level indicators, including abnormal behavior compared to the normal pattern of life for that entity, all under a score of 50 on a threat indicator score). The investigations by the cyber threat analyst module can happen over a relatively long period of time and be far more in depth than the analyzer module which will work with the other modules and AI models to confirm that a cyber threat has in fact been detected.

The data gatherer module may further extract data from the data store at the request of the cyber threat analyst module and/or analyzer module on each possible hypothetical threat that would include the abnormal behavior or suspicious activity and then can assist to filter that collection of data down to relevant points of data to either 1) support or 2) refute each particular hypothesis of what the cyber threat, the suspicious activity and/or abnormal behavior relates to. The data gatherer module cooperates with the cyber threat analyst module and/or analyzer module to collect data to support or to refute each of the one or more possible cyber threat hypotheses that could include this abnormal behavior or suspicious activity by cooperating with one or more of the cyber threat hypotheses mechanisms to form and investigate hypotheses on what are a possible set of cyber threats.

Thus, the cyber threat analyst module is configured to cooperate with the AI models trained with machine learning on how to form cyber threat hypotheses and how to conduct investigations for a cyber threat hypothesis to form and investigate hypotheses on what are a possible set of cyber threats and then can cooperate with the analyzer module with the one or more data analysis processes to confirm the results of the investigation on the possible set of cyber threats hypotheses that would include the at least one of i) the abnormal behavior, ii) the suspicious activity, and iii) any combination of both, identified through cooperation with the one or more AI models trained with machine learning to model a normal behavior of entities in the network under analysis.

Note, in the first level of threat detection, the data gatherer module and the analyzer module cooperate to supply any data and/or metrics requested by the analyzer module cooperating with the AI models trained on possible cyber threats to support or rebut each possible type of cyber threat. Again, the analyzer module can cooperate with the other modules and AI models to rapidly detect and then cooperate with an autonomous response module to autonomously respond to overt and obvious cyber threat attacks, (including ones found to be supported by the cyber threat analyst module).

As a starting point, the AI-based cyber security appliance 100 can use multiple modules, each capable of identifying abnormal behavior and/or suspicious activity by comparing that behavior against the AI models of normal behavior for the control plane and/or management plane under analysis, which is supplied to the analyzer module and/or the cyber threat analyst module. The analyzer module and/or the cyber threat analyst module may also receive other inputs such as AI model breaches, AI classifier breaches, a trigger to start an investigation from an external source, etc.

Many other model breaches of the AI models trained with machine learning on the normal behavior of the system can send an input into the cyber threat analyst module and/or the trigger module to trigger an investigation to start the formation of one or more hypotheses on what are a possible set of cyber threats that could include the initially identified abnormal behavior and/or suspicious activity. Note, the cyber threat analyst module's deeper analysis can look at example factors such as i) how long has the endpoint existed or is registered; ii) what kind of certificate is the communication using; iii) is the endpoint on a known good domain or known bad domain or an unknown domain, iv) should the user in this group have access to these network device and/or privileges, v) do external threat services indicate that a potential user's log in credentials are potentially compromised, vi) if the endpoint unknown what other information exists such as registrant's name and/or country; vii) how rare is the observed communication and/or activity; viii) etc.

Note, the cyber threat analyst module cooperating with the AI models trained with machine learning on how to form cyber threat hypotheses and how to conduct investigations for a cyber threat hypothesis in the AI-based cyber security appliance 100 provides an advantage as it reduces the time taken for human-led or cybersecurity investigations, provides an alternative to manpower for small organizations, and improves detection (and remediation) capabilities within the cyber security appliance 100.

The cyber threat analyst module that forms and investigates hypotheses on what are the possible set of cyber threats can use hypotheses mechanisms including any of 1) one or more AI models trained on how human cyber security analysts form cyber threat hypotheses and how to conduct investigations for a cyber threat hypothesis that would include at least an anomaly of interest, 2) one or more scripts outlining how to conduct an investigation on a possible set of cyber threats hypotheses that would include at least the anomaly of interest, 3) one or more rules-based models on how to conduct an investigation on a possible set of cyber threats hypotheses and how to form a possible set of cyber threats hypotheses that would include at least the anomaly of interest, and 4) any combination of these. Again, the AI models trained on 'how to form cyber threat hypotheses and how to conduct investigations for a cyber threat hypothesis' may use supervised machine learning on human-led cyber threat investigations and then steps, data, metrics, and metadata on how to support or to refute a plurality of the possible cyber threat hypotheses, and then the scripts and rules-based models will include the steps, data, metrics, and metadata on how to support or to refute the plurality of the possible cyber threat hypotheses. The cyber threat analyst module and/or the analyzer module can feed the cyber threat details to an assessment module to generate a threat risk score that indicate a level of severity of the cyber threat.

The modules and Artificial Intelligence models in the cyber security appliance 100 both monitor activities and communications in the network as well as send autonomous response signals to protect the telecommunications network from cyber threats. The autonomous response module works with the assessment module when the cyber threat is detected and autonomously takes one or more actions to mitigate the cyber threat by at least one of 1) disrupting a telecom connection being used by the cyber threat and 2) restricting one or more components affected by the cyber threat to limit i) telecom traffic out of those components and activities performed by the components to their normal behavioral (e.g. normal pattern of life) activities by blocking specific activities and communications that show up as abnormal for that component based on an understanding of what is normal indicated by the self-learning models that use unsupervised machine learning algorithms to model the normal behavior of the communications and activities in the control plane and/or in the management plane.

In another example, the autonomous responses to suspected cyber threats possible for telecommunications control and management activities may include disrupting a SCTP association in a similar way as resetting a TCP connection. In a telecom SCTP association, you have multiple routes (SCTP connections) going between all of the different IP addresses on an SCTP endpoint, and there exists a primary route as well as then a set of secondary connections which are sending keeper lives to each other. By recursively shutting off the primary root every time it is assigned, all connections will be terminated in order of availability to that association. The autonomous responses can achieve similar results on IT equipment—drive firewalls, drive access control systems, etc.

Figure 3:
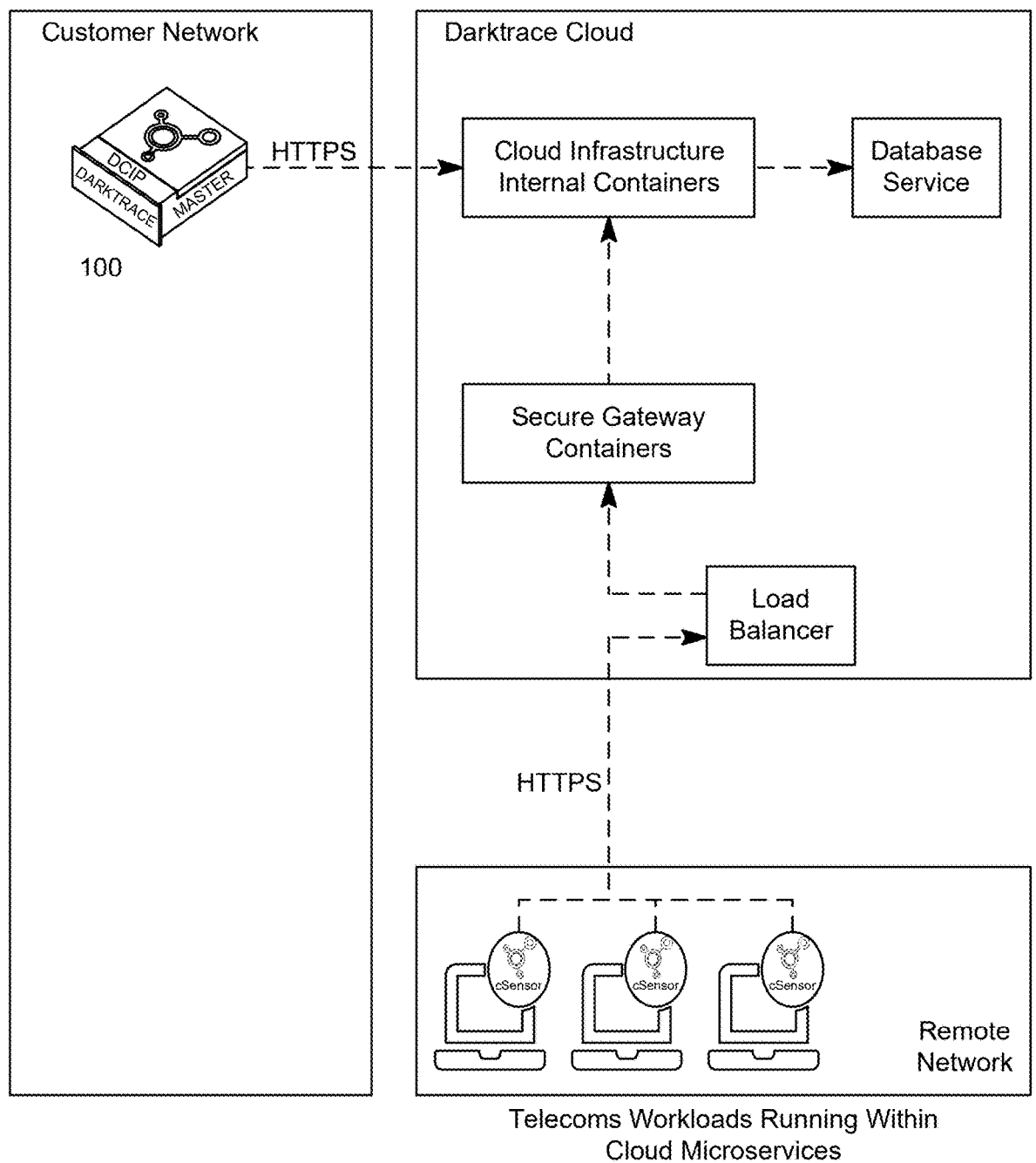

FIG. 3 illustrates a block diagram of an embodiment of at least one of a control plane module and a management module configured to receive information from and send information to sensors located within components of the telecommunications network and to components, such as software agents acting as sensors, located outside of a control of the telecommunications network in microservices provided by a third party. The telecommunications network (e.g. customer's network) may have a cyber security appliance 100 plugged into that network and connections to external Cloud networks. The connections to external Cloud networks including a Cloud run by the cyber security provider as well as remote Cloud networks that can run workloads running within cloud microservices.

The control plane and management modules of the cyber security appliance 100 can monitor and analyze the wired bits of the telecom networks (e.g. physical network components and/or hypervisors) and use processes such as packet mirroring to further investigate different features and information regarding the telecom packets themselves. The control plane and management modules of the cyber security appliance 100 via the sensors can also monitor virtual machines inside a datacenter and microservices in their own private cloud, or even when the telecommunications network is going to deploy some of its own workload into somebody else's/a third party's public cloud.

The control plane and management modules of the cyber security appliance 100 can be configured to work with a set of software agents external to the cyber security appliance housing 100. For example, a software agent can be coded to be able to handle Kubernetes pod deployments into a third-party owned hyper-scale cloud. Kubernetes is an example open-source container-orchestration system for automating computer application deployment, scaling, and management. The pods are monitored whenever they get deployed by a software agent (such as a cSensor™) either as part of the telecom's container itself or as a sidecar container deployed within the same pod. The software agents can exist in various parts of the telecoms system to provide more narrowly focused/surgical autonomous responses to mitigate a detected cyber threat. The autonomous responses can be guided by machine learning as well as provide a user interface in the formatting module that is programmable to set acceptable autonomous responses selected by the administrators of the telecom network. For example, the software agents can control the networking capabilities of the particle container that the software agent is installed on.

The remote network with the container-orchestration system has these software agents running inside telecom's workloads within a pod. The software agent establishes secure communications with the cyber security appliance 100 to get visibility of that back to the cyber security appliance 100 from the endpoint software agent.

Figure 4:
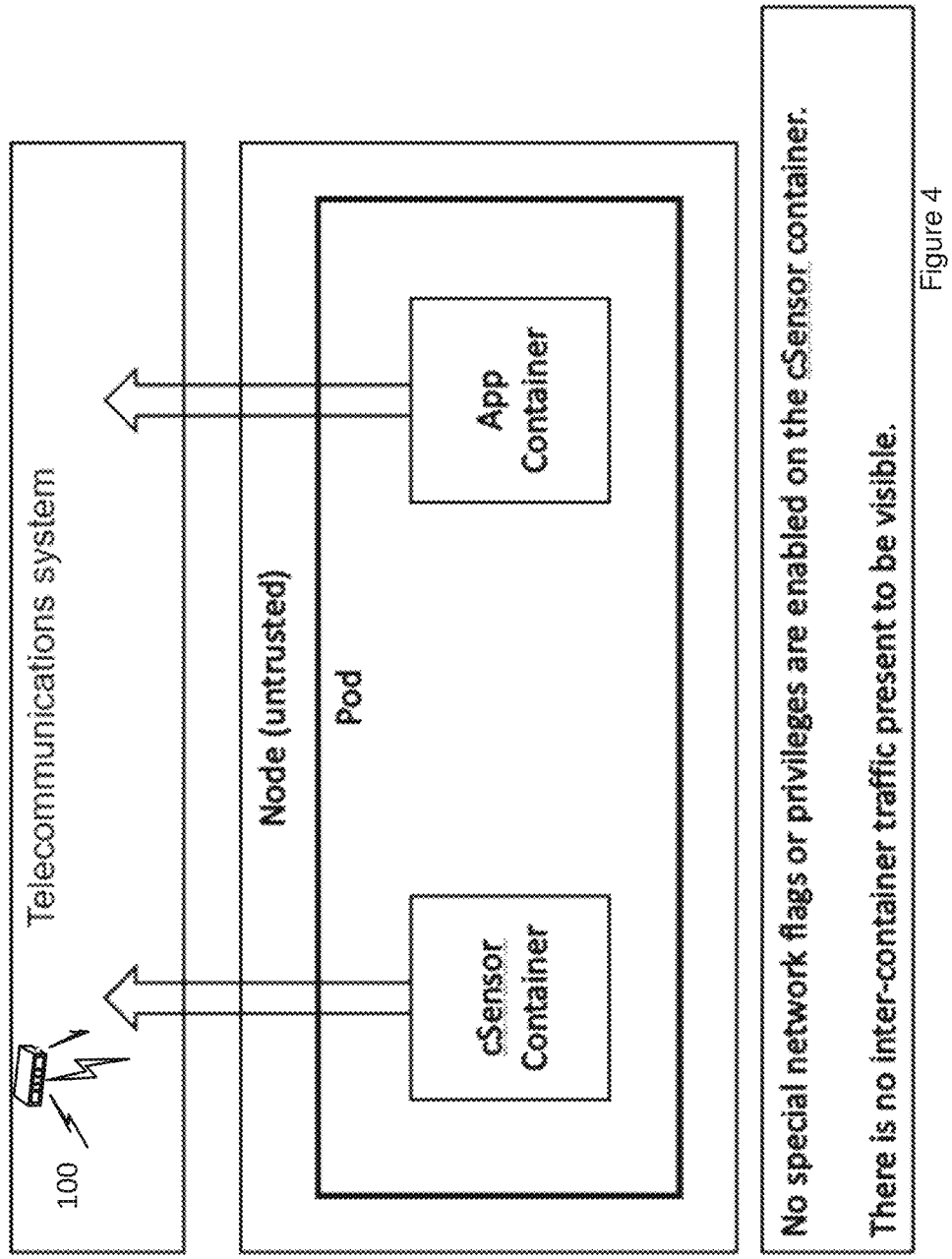
Figure 5:
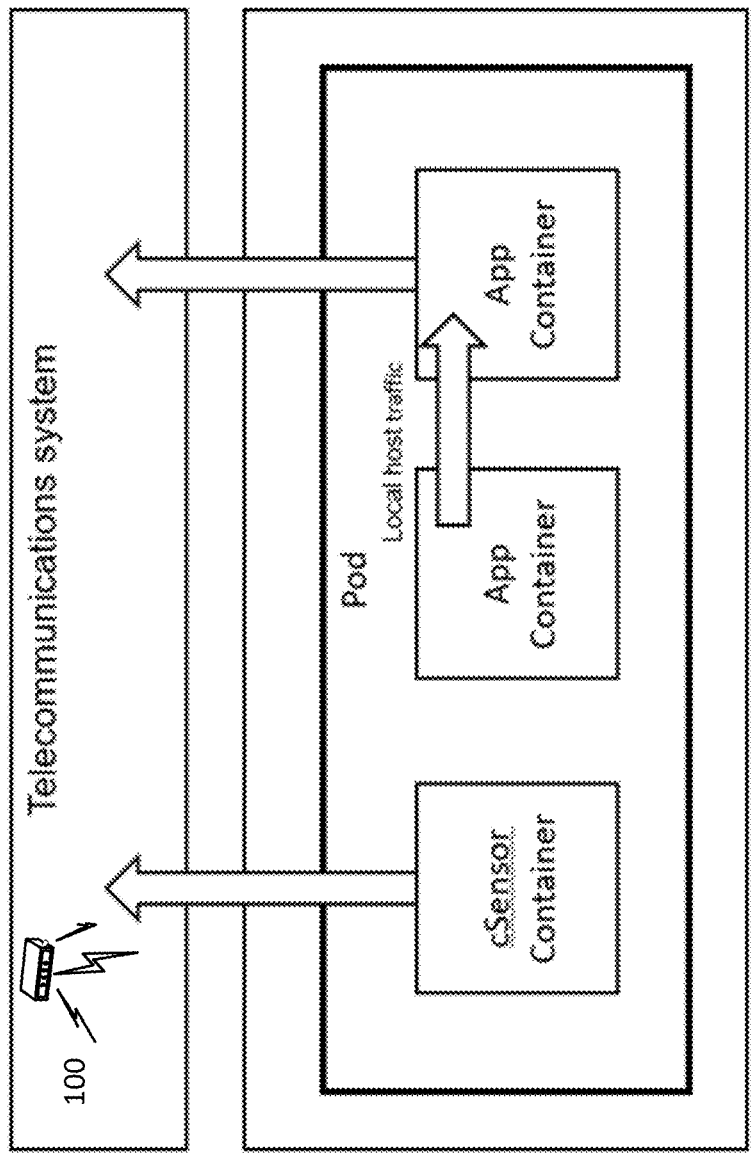
Figure 6:
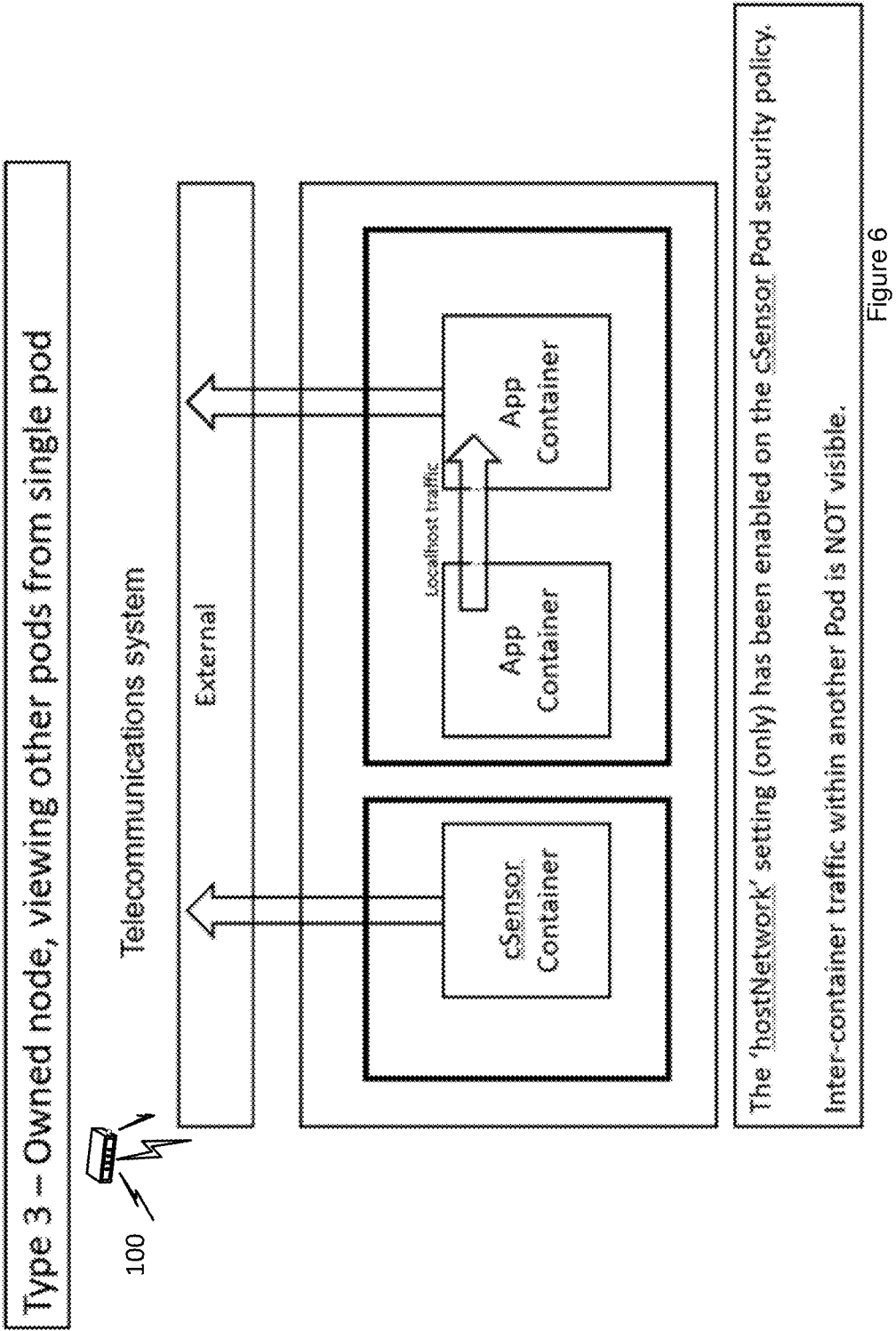

FIGS. 4-6 illustrate variations in the deployment of the software agents depending on what is the workload that the telecom network is having performed within the container-orchestration system, and whether the telecommunications network owns the Cloud with the container-orchestration system such as Kubernetes nodes or not.

FIGS. 4 and 5 show deployments of the software agents when a third party's Cloud runs the container-orchestration system. The telecommunications network has given them, in Kubernetes terms, a pod, a workload. The telecommunications network being protected wants the third party's microservice (somebody else's Cloud) to perform this particle workload.

FIG. 4 illustrates a block diagram of an embodiment of at least one of a control plane module and a management plane configured to receive information from and send information to a software agent acting as a sensor located outside of a control of the telecommunications network in a container-orchestration system (e.g. microservice) operated by a third party to monitor communications and activities of one or more applications occurring in a same pod of the container-orchestration system. In FIG. 4, the pod is untrusted where the telecommunications network is running at least some workload in a third party's Cloud. The container-orchestration system is running a single application in a container in a pod. The software agent, such as a cSensor™, is located in a container in the same pod with the application being monitored.

No special network flags or privileges are enabled on the container containing the software agent. There is no inter-container traffic present but rather a lone application in the neighboring pod receiving telecom packets in and sending telecom packets out.

The endpoint software agents located in a container/containerized application get visibility of 'the workload occurring'/'what is happening' within the container; and thus, provides a visibility extension into the container. Note, a containerized applications orchestration system, such as Kubernetes, automates operational tasks of container management and includes built-in commands for deploying applications, rolling out changes to the applications, scaling the applications up and down to fit changing needs, monitoring the applications, and more—making it easier to manage applications.

The control module and management module use one or more software agents as sensors to get visibility over what is happening inside the pod. The application in the container is sent the particular workload that the telecommunications network actually wants to run. The software agent is configured to fire up a second container inside the pod, which is running the endpoint software agent.

In FIGS. 4 and 5, the sensor/endpoint software agent doesn't take any special privileges, which means the software agent is entirely happy running inside somebody else's pod without the third-party needing to do any special work for the software agent. The software agent also has visibility over all of the external traffic. So all of the talking to and from the container with the outside world from the application and its workload can be monitored by the software agent and potentially acted upon with an autonomous response action. The software agent can be configured to reside in and monitor a central services directory.

FIG. 5 illustrates a block diagram of an embodiment of at least one of a control plane module and a management plane configured to receive information from and send information to a software agent acting as a sensor located outside of a control of the telecommunications network in a container-orchestration system (e.g. microservice) operated by a third party to monitor communications and activities of two or more applications occurring in a same pod of the container-orchestration system.

The control plane module and management plane can receive information from and send information to a software agent acting as a sensor located outside of a control of the telecommunications network in a container-orchestration system to monitor at least communications occurring between two or more applications located in a same pod of the container-orchestration system.

In FIG. 5, the pod is untrusted where the telecommunications network is running at least some workload in a third party's Cloud. The container-orchestration system is running multiple applications in the pod. The software agent, such as a cSensor™, is located in a container in the same pod with the application being monitored. No special network flags or privileges are enabled on the container containing the software agent. The multiple application containers talk to each other. Inter-container traffic between the other containers in the pod is visible via loopback adapter monitoring. The inter-container traffic runs basically through a local host so the applications do establish typical network sockets. The configuration in the sensor/endpoint software agent is set to monitor those network sockets (what are called loop back interfaces). The software agent in the same pod can monitor the communications between applications in the containers as they talk to each other. Also, via the sensor/endpoint agent, the modules can also still see the external traffic into and out of the microservice/container-orchestration system. Note, the software agent can see the applications in the containers as they talk to each other as well, which is typically unencrypted. Everything that talks outside is likely to be encrypted but not typically so for communications within a pod between containers. Therefore, inter-container traffic is a much richer source of data for visibility.

Note, there are no special flags needed, so the fact the sensor/endpoint agent is running inside a third party's cloud doesn't really matter. The third party owner of that cloud doesn't need to do anything special to make this arrangement of the software agent running in a container within a pod possible.

FIG. 6 illustrates a block diagram of an embodiment of at least one of a control plane module and a management plane configured to receive information from and send information to a software agent acting as a sensor located inside of a control of the telecommunications network in a container-orchestration system (e.g. microservice) to monitor communications and activities of one or more applications occurring in a same pod of the container-orchestration system.

In FIG. 6, the pod is trusted because the telecommunications network is running at least some workload in its own Cloud as well as the rest of the workload in the physical portions of the telecommunications network. The software agent can view other pods from a single pod. The cyber security appliance 100 can direct the telecommunications network to make a special pod, which only has the endpoint agent inside it. The software agent, such as cSensor™, is located in a container in a pod separate from the one or more applications being monitored. The cyber security appliance 100 can direct the telecommunications network to set a special flag in the configuration. The 'hostNetwork' setting (only) has been enabled on the software agent in its container in the pod's security policy.

Next, the telecommunications network can have other deployments of software agents as well.

For example, the telecommunications network owns the Cloud where the microservices are being implemented. A first software agent such as a vSensor™ is locally available within the same Cloud environment adjacent to the container environment to centralize communications from multiple other software agents inside the containers. A second software agent such as an osSensor™ can be located inside each container to view external communications into and out. When the configuration settings are made and pod policy changes are made then the software agent can also monitor localhost (inter-container) traffic.

Referring back to FIG. 3, a simulation engine may exist in the backend cloud in Cloud master cyber security appliance 100 and its associated servers. The simulation engine models and simulates an external attack surface into the telecom network and high-risk attack paths through the telecom network. The simulation engine and cloud master cyber security appliance 100 run the simulations to provide analysis of the external attack surface into the telecom network as well as what attack paths will be used.

As discussed, the cyber security appliance 100 with its AI models and modules cooperate to perform several processes including supplying user interfaces to operators of the telecommunications network, machine learning on telecom cyber threat types to be modeled, machine learning on how to conduct cyber threat investigations, machine learning on how to conduct simulations on how a cyber threat may attack the telecommunications network, and other machine learning approaches to understand what is benign and normal behavior and what is abnormal, as well as other processes. The cyber threat detection portion of the cyber security appliance 100 can use Artificial Intelligence algorithms trained to perform a first machine-learned task of detecting the cyber threat. The autonomous response module can use Artificial Intelligence algorithms trained to perform a second machine-learned task of taking one or more mitigation actions to mitigate the cyber threat. A cyber-security restoration engine can use Artificial Intelligence algorithms trained to perform a third machine-learned task of remediating the system being protected back to a trusted operational state. The simulation engine can use Artificial Intelligence algorithms trained to perform a fourth machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack. All four of these four Artificial Intelligence-based engines are in communication with each other and configured to work in tandem.

Additional Information on Training of the AI Models and AI Classifiers Pre-Deployment and then During Deployment In step 1, an initial training of the Artificial Intelligence model 'trained on potential cyber threats' can occur using unsupervised learning and/or supervised learning on characteristics and attributes of known potential cyber threats including malware, insider threats, and other kinds of cyber threats that can occur within that telecommunications network. Each Artificial Intelligence can be programmed and configured with the background information to understand and handle particulars, including different types of data, protocols used, types of devices, user accounts, etc. of the system being protected. The Artificial Intelligence pre-deployment can all be trained on the specific machine learning task that they will perform when put into deployment. For example, the AI model trained on identifying a specific cyber threat learns in the pre-deployment training both i) the characteristics and attributes of known potential cyber threats as well as ii) a set of characteristics and attributes of each category of potential cyber threats and their weights assigned on how indicative certain characteristics and attributes correlate to potential cyber threats of that category of threats. In this example, the AI model trained on identifying a specific cyber threat can be trained with machine learning such as Linear Regression, Regression Trees, Non-Linear Regression, Bayesian Linear Regression, Deep learning, etc. to learn and understand the characteristics and attributes in that category of cyber threats. Later, when in deployment in a telecom network being protected by the cyber security appliance 100, the AI model trained on potential cyber threats can determine whether a potentially unknown threat has been detected via a number of techniques including an overlap of some of the same characteristics and attributes in that category of cyber threats. The AI model may use unsupervised learning when deployed to better learn newer and updated characteristics of cyber threat attacks.

In the information security context, supervised machine learning is used to train a database of previously seen behaviors, where each behavior is known to be either malicious or benign and is labeled as such. A large amount of human input is needed to label the training data. New activities can then be analyzed to see whether they more closely match those in the malicious class, or those in the benign class. Any that are evaluated as being sufficiently likely to be malicious are again flagged as threats. However, the AI model trained on potential cyber threats can also use unsupervised learning to update and self-learn new patterns and symptoms when deployed to protect the network.

In an embodiment, the one or more self-learning models trained on a normal behavior of entities in the system are self-learning AI model using unsupervised machine learning and machine learning algorithms to analyze patterns and 'learn' what is the 'normal behavior' of the network by analyzing data on the activity on, for example, the control plane level, at the management plane level, and at the user/data plane level. The self-learning AI model using unsupervised machine learning understands the system under analysis' normal patterns of life in, for example, a week of being deployed on that system, and grows more bespoke with every passing minute. The AI unsupervised learning model learns patterns from the features in the day to day dataset and detecting abnormal data which would not have fallen into the category (cluster) of normal behavior. The self-learning AI model using unsupervised machine learning can simply be placed into an observation mode for an initial week or two when first deployed on a network/domain in order to establish an initial normal behavior for entities in the network/domain under analysis.

A deployed self-learning model trained to use unsupervised machine learning algorithms to model a normal behavior of entities in the system can be configured to observe the nodes in the network being protected. Training on a normal behavior of entities in the system can occur while monitoring for the first week or two until enough data has been observed to establish a statistically reliable set of normal operations for each node (e.g. user account, device, etc.). The training of one or more self-learning models trained with machine learning to model the normal behavior the entities in the telecommunications network can start where each type of telecommunications network will generally have some common typical behavior with each model trained specifically to understand components/devices, protocols, activity level, etc. to that type of telecommunications network. Instead of relying on knowledge of past threats, the AI model can use unsupervised machine learning algorithms that independently classifies data and detects compelling patterns. From this, the AI models use unsupervised machine learning algorithms forms an understanding of 'normal' behaviors across the infrastructure, pertaining to devices, users, or cloud containers and sensors, and detects deviations from this evolving 'pattern of life' that may point to a developing threat. The system can look for rare occurrences in the data to detect the cyber threat.

Alternatively, pre-deployment machine learning training of one or more Artificial Intelligence models trained on a normal behavior of entities in the system can occur. Initial training of one or more Artificial Intelligence models trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. What is normal behavior of each entity within that system can be established prior to deployment and then adjusted during deployment. Initial training of one or more Artificial Intelligence models trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. What is normal behavior of each entity within that system can be established either prior to deployment and then adjusted during deployment.

During deployment, what is considered normal behavior will change as each different entity's behavior changes and will be reflected through the use of unsupervised learning in the model such as various Bayesian techniques, clustering, etc. The AI models can be implemented with various mechanisms such neural networks, decision trees, etc., and any combinations of these.

At its core, the self-learning AI models that model the normal behavior (e.g. a normal pattern of life) of entities in the network mathematically characterizes what constitutes 'normal' behavior, based on the analysis of a large number of different measures of a device's network behavior—packet traffic and network activity/processes including Server access, Data volumes, Timings of events, Credential use, Connection type, volume, and directionality of, for example, uploads/downloads into the network, File type, packet intention, Admin activity, Resource and information requests, command sent, etc.

Clustering Methods

In order to model what should be considered as normal for a device or cloud container, its behavior can be analyzed in the context of other similar entities on the network. The AI models can use unsupervised machine learning to algorithmically identify significant groupings, a task which is virtually impossible to do manually. To create a holistic image of the relationships within the network, the AI models and AI classifiers employ a number of different clustering methods, including matrix-based clustering, density-based clustering, and hierarchical clustering techniques. The resulting clusters can then be used, for example, to inform the modeling of the normative behaviors and/or similar groupings.

Modeling Dynamic Environments

A major challenge in modeling the behaviors of a dynamically evolving network and its infrastructure is the huge number of potential predictor variables. For example, the observation of packet traffic and host activity within an enterprise LAN or WAN, where both input and output can contain many inter related features (protocols, source and destination machines, log changes, and rule triggers), learning a sparse and consistent structured predictive function is important. In this context, the AI models and AI classifiers can employ a large-scale computational approach to understand sparse structure in models of network connectivity based on applying L1—regularization techniques (the lasso method). This allows the artificial intelligence to discover true associations between different elements of a network which can be cast as efficiently solvable convex optimization problems and yield parsimonious models. Various mathematical approaches assist.

$$p^\sim(x_t|y_t) = \sum_{i=1}^{N} w^{(i)} \times \delta(x_t^{(i)})$$

Next, one or more supervised machine learning AI models are trained to create possible hypotheses and how to perform cyber threat investigations on agnostic examples of past historical incidents of detecting a multitude of possible types of cyber threat hypotheses previously analyzed by human cyber threat analysis. AI models trained on forming and investigating hypotheses on what are a possible set of cyber threats can be trained initially with supervised learning. Thus, these AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful. More on the training of the AI models that are trained to create one or more possible hypotheses and perform cyber threat investigations will be discussed later.

Next, the various Artificial Intelligence models and AI classifiers combine use of unsupervised and supervised machine learning to learn 'on the job'—it does not depend upon solely knowledge of previous cyber threat attacks. The Artificial Intelligence models and classifiers combine use of unsupervised and supervised machine learning constantly revises assumptions about behavior, using probabilistic mathematics, that is always up to date on what a current normal behavior is, and not solely reliant on human input. The Artificial Intelligence models and classifiers combine use of unsupervised and supervised machine learning on cyber security is capable of seeing hitherto undiscovered cyber events, from a variety of threat sources, which would otherwise have gone unnoticed.

Next, these cyber threats can include, for example: Insider threat—malicious or accidental, Zero-day attacks—previously unseen, novel exploits, latent vulnerabilities, machine-speed attacks—ransomware and other automated attacks that propagate and/or mutate very quickly, Cloud and SaaS-based attacks, other silent and stealthy attacks advance persistent threats, advanced spear-phishing, etc.

Ranking the Cyber Threat

The assessment module can cooperate with the AI models trained on possible cyber threats to use AI algorithms to account for ambiguities by distinguishing between the subtly differing levels of evidence that characterize network data. Instead of generating the simple binary outputs 'malicious' or 'benign', the AI's mathematical algorithms produce outputs marked with differing degrees of potential threat. This enables users of the system to rank alerts in a rigorous manner, and prioritize those which most urgently require action. Meanwhile, it also assists to avoid the problem of numerous false positives associated with simply a rule-based approach.

More on the Operation of the Cyber Security Appliance 100

As discussed in more detail below, the analyzer module can cooperate with the one or more unsupervised machine learning models trained on to model a normal behavior of entities in order to perform anomaly detection against the actual normal pattern of life for that system to determine whether an anomaly (e.g., the identified abnormal behavior and/or suspicious activity) is malicious or benign. In the operation of the cyber security appliance 100, the potential cyber threat can be previously unknown but shares enough (or does not share enough) in common with the traits from the AI models trained on cyber threats to now be identified as malicious or benign. Note, if later confirmed as malicious, then the AI models trained with machine learning on possible cyber threats can update their training. Likewise, as the cyber security appliance 100 continues to operate, then the one or more machine learning models trained on to model a normal behavior for each of the entities in the system can be updated and trained with unsupervised machine learning algorithms. The analyzer module can use any number of data analysis processes (discussed more in detail below and including the agent analyzer data analysis process here) to help obtain system data points so that this data can be fed and compared to the one or more machine learning models trained on a normal pattern of life, as well as the one or more machine learning models trained on potential cyber threats, as well as create and store data points with the connection fingerprints.

All of the above AI models can continually learn and train with unsupervised machine learning algorithms on an ongoing basis when deployed in their system that the cyber security appliance 100 is protecting. Thus, learning and training on what is normal behavior for each user, each device, and the system overall and lowering a threshold of what is an anomaly.

As discussed, the AI models are trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful. In addition, when various different steps to either i) support or ii) refute the possible set of cyber threats hypotheses worked better or worked worse is also updated.

Anomaly Detection/Deviations

Anomaly detection can discover unusual data points in your dataset. Anomaly can be a synonym for the word 'outlier'. Anomaly detection (or outlier detection) is the identification of rare items, events or observations which raise suspicions by differing significantly from the majority of the data. Anomalous activities can be linked to some kind of problems or rare events. Since there are tons of ways to induce a particular cyber-attack, it is very difficult to have information about all these attacks beforehand in a dataset. But, since the majority of the user activity and device activity in the system under analysis is normal, the system overtime captures almost all of the ways which indicate normal behavior. And from the inclusion-exclusion principle, if an activity under scrutiny does not give indications of normal activity, the self-learning AI model using unsupervised machine learning can predict with high confidence that the given activity is anomalous. The AI unsupervised learning model learns patterns from the features in the day to day dataset and detecting abnormal data which would not have fallen into the category (cluster) of normal behavior. The goal of the anomaly detection algorithm through the data fed to it is to learn the patterns of a normal activity so that when an anomalous activity occurs, the modules can flag the anomalies through the inclusion-exclusion principle. The goal of the anomaly detection algorithm through the data fed to it is to learn the patterns of a normal activity so that when an anomalous activity occurs, the modules can flag the anomalies through the inclusion-exclusion principle. The cyber threat module can perform its two level analysis on anomalous behavior and determine correlations.

In an example, 95% of data in a normal distribution lies within two standard-deviations from the mean. Since the likelihood of anomalies in general is very low, the modules cooperating with the AI model of normal behavior can say with high confidence that data points spread near the mean value are non-anomalous. And since the probability distribution values between mean and two standard-deviations are large enough, the modules cooperating with the AI model of normal behavior can set a value in this example range as a threshold (a parameter that can be tuned over time through the self-learning), where feature values with probability larger than this threshold indicate that the given feature's values are non-anomalous, otherwise it's anomalous. Note, this anomaly detection can determine that a data point is anomalous/non-anomalous on the basis of a particular feature. In reality, the cyber security should not flag a data point as an anomaly based on a single feature. Merely, when a combination of all the probability values for all features for a given data point is calculated can the modules cooperating with the AI model of normal behavior can say with high confidence whether a data point is an anomaly or not?

Again, the AI models trained on a normal behavior of entities in a network under analysis may perform the cyber threat detection through a probabilistic change in a normal behavior through the application of, for example, an unsupervised Bayesian mathematical model to detect the behavioral change in computers and computer networks. The Bayesian probabilistic approach can determine periodicity in multiple time series data and identify changes across single and multiple time series data for the purpose of anomalous behavior detection. Please reference U.S. Pat. No. 10,701,093 granted Jun. 30, 2020, titled "Anomaly alert system for cyber threat detection" for an example Bayesian probabilistic approach, which is incorporated by reference in its entirety. In addition, please reference US patent publication number "US2021273958A1 filed Feb. 26, 2021, titled "Multi-stage anomaly detection for process chains in multi-host environments" for another example anomalous behavior detector using a recurrent neural network and a bidirectional long short-term memory (LSTM), which is incorporated by reference in its entirety. In addition, please reference US patent publication number "US2020244673A1, filed Apr. 23, 2019, titled "Multivariate network structure anomaly detector," which is incorporated by reference in its entirety, for another example anomalous behavior detector with a Multivariate Network and Artificial Intelligence classifiers.

In an example of management and control planes under analysis, management and control raw sources of data can be examined along with a large number of derived metrics that each produce time series data for the given metric. Unsupervised Learning can break down features of what it is analyzing (e.g. a network node of a device or user account), which can be useful for categorization, and then identify what else has similar or overlapping feature sets matching to what it is analyzing. The machine learning algorithms also can analyze patterns in the data and can identify similarities in the patterns.

The AI models trained on a normal behavior of entities in a network under analysis may perform the cyber threat detection through a probabilistic change in a normal behavior through the application of, for example, an unsupervised Bayesian mathematical model to detect behavioral change through other forms of anomaly detection such as an amount of standard deviations away from a Gaussian Probability Distribution where most of the data points are spread around a central (mean) location.

Clustering is also an important concept when it comes to unsupervised learning. Clustering mainly deals with finding a structure or pattern in a collection of uncategorized data. Unsupervised Learning Clustering algorithms are used to process the data and find natural clusters(groups) if they exist in the data. Clustering allows you to adjust the amount of groups/categories as well as the granularity of these groups. Clustering algorithms that can be implemented include Hierarchical clustering, K-means clustering, K-NN (k nearest neighbors), Principal Component Analysis, Singular Value Decomposition, and Independent Component Analysis. Note, AI classifiers and the Artificial Intelligence models can utilize clustering to split the dataset into groups based on their similarities.

A Little More on the Modules' Interactions

The gatherer module cooperates with a data store. The data store stores comprehensive logs for network traffic observed. These logs can be filtered with complex logical queries and each IP packet can be interrogated on a vast number of metrics in the network information stored in the data store. Similarly, other telecommunications network communications and data may be collected and stored in the data store. The gatherer module may consist of multiple automatic data gatherers that each look at different aspects of the data depending on the particular hypothesis formed for the analysed event. The data relevant to each type of possible hypothesis can be automatically pulled from additional external and internal sources. Some data is pulled or retrieved by the gatherer module for each possible hypothesis.

The data store can store the metrics and previous threat alerts associated with network traffic for a period of time, which is, by default, at least 27 days. This corpus of data is fully searchable. The cyber security appliance 100 works with network probes to monitor network traffic and store and record the data and metadata associated with the network traffic in the data store.

The data gather module may have a process identifier classifier. Again, the AI classifier can utilize one of the various clustering algorithms discussed herein to split the dataset into groups based on their similarities. Also, the process identifier classifier can identify and track each process and device in the network, under analysis, making communication connections. A data store cooperates with the process identifier classifier to collect and maintain historical data of processes and their connections, which is updated over time as the network is in operation. In an example, the process identifier classifier can identify each process running on a given device along with its endpoint connections, which are stored in the data store. Similarly, data from any of the networks under analysis may be collected and compared.

Examples of domains/networks under analysis can include any of i) an Informational Technology network, ii) an Operational Technology network, iii) a Cloud service, iv) a SaaS service, v) an endpoint device, vi) a telecommunications network including its management plane and control plane, and vii) any combinations of these. The control plane module and the management plane module are constructed and coded to interact with and understand their specific network. A control plane module can be configured to receive information from and send information to, in this example, control plane based sensors (i.e., probes, taps, etc.). The control plane module also has algorithms and components configured to understand, in this example, control plane parameters, control plane protocols, control plane activity, and other control plane characteristics of the telecom network under analysis. A management plane module can be configured to receive information from and send information to sensors (i.e., probes, taps, software agents, etc.) located within the telecommunications network to monitor and collect information via at least performing a deep packet inspection on telecom packets in the telecommunications network. The management plane module also has algorithms and components configured to understand, in this example, management plane parameters, management plane protocols and formats, management plane activity, and other management plane characteristics of the telecom network under analysis. The coordinator module is configured to work with various machine learning algorithms and relational mechanisms to i) assess, ii) annotate, and/or iii) position in a vector diagram, a directed graph, a relational database, etc., activity including events occurring, for example, in the control plane compared to activity including events occurring in the management plane. The control plane and management plane modules can cooperate to exchange and store their information with the data store.

The process identifier classifier in the data gather module can cooperate with additional classifiers in each of the control plane and management plane modules to assist in tracking individual processes and associating them with entities in a network under analysis as well as individual processes and how they relate to each other. The process identifier classifier can cooperate with other trained AI classifiers in the modules to supply useful metadata along with helping to make logical nexuses.

A feedback loop of cooperation exists between the gatherer module, the analyzer module, one or more models trained on different aspects of this process, and the cyber threat analyst module to gather information to determine whether a cyber threat is potentially attacking the networks/domains under analysis.

Determination of Whether Something is Likely Malicious.

In the following examples the analyzer module and/or cyber threat analyst module can use multiple factors to the determination of whether a process, event, object, entity, etc. is likely malicious.

In an example, the analyzer module and/or cyber threat analyst module can cooperate with the Artificial Intelligence models trained on potential cyber threats to detect whether the anomalous activity detected, such as suspicious routing commands and/or addresses, to exhibit traits that may suggest a malicious intent, such as phishing links, scam language, sent from suspicious domains, etc. The analyzer module and/or cyber threat analyst module can also cooperate with the Artificial Intelligence models trained on telecom cyber threats to detect whether the anomalous activity detected, such as suspicious links, URLs, domains, user activity, commands, etc., may suggest a malicious intent as indicated by the Artificial Intelligence models trained on potential telecom based cyber threats.

In the above example, the analyzer module and/or cyber threat analyst module can cooperate with the one or more Artificial Intelligence models trained with machine learning on the normal pattern of life for entities in a telecommunications network under analysis. Likewise, the analyzer module and/or cyber threat analyst module can cooperate with the one or more Artificial Intelligence models trained with machine learning on the normal pattern of life for entities in a management plane under analysis to detect, in this example, anomalous network activity by user and/or devices in the network, which is detected as outside of the usual pattern of life for each entity.

Thus, the analyzer module and/or cyber threat analyst module can be configured with one or more data analysis processes to cooperate with the one or more AI models trained with machine learning on the normal pattern of life in the system, to identify an anomaly of at least one of i) the abnormal behavior, ii) the suspicious activity, and iii) the combination of both, from one or more entities in the system. Note, other sources, such as other model breaches, can also identify at least one of i) the abnormal behavior, ii) the suspicious activity, and iii) the combination of both to trigger the investigation.

Accordingly, during this cyber threat determination process, the analyzer module and/or cyber threat analyst module can also use AI classifiers that look at the features and determine a potential maliciousness based on commonality or overlap with known characteristics of malicious processes/entities. Many factors including anomalies that include unusual and suspicious behavior, and other indicators of processes and events are examined by the one or more AI models trained on potential cyber threats and/or the AI classifiers looking at specific features for their malicious nature in order to make a determination of whether an individual factor and/or whether a chain of anomalies is determined to be likely malicious.

Next, the analyzer module and/or cyber threat analyst module can have an external input to ingest threat intelligence from other devices in the network cooperating with the cyber security appliance 100. Next, the analyzer module and/or cyber threat analyst module can look for other anomalies, such as model breaches, while the AI models trained on potential cyber threats can assist in examining and factoring other anomalies that have occurred over a given timeframe to see if a correlation exists between a series of two or more anomalies occurring within that time frame.

The analysis module and/or cyber threat analyst module can combine these indicators of compromise with many other weak indicators to detect the earliest signs of an emerging threat, including previously unknown threats, without using strict blacklists or hard-coded thresholds. However, the AI classifiers can also routinely look at blacklists, etc. to identify maliciousness of features looked at.

Another example of features looked at. A deeper analysis of endpoint data can include things like the domain metadata itself that can reveal peculiarities and as such one or more indicators of potentially a malicious domain, such as its URL, then this could help confirm an analysis to determine that indeed a cyber threat has been detected. The analysis module can also look at factors of how rare the endpoint connection is, how old the endpoint is, where geographically the endpoint is located, how a security certificate associated with a communication is verified only by endpoint or by external $3^{rd}$ party, just to name a few additional factors. The analysis module (and similarly the cyber threat analyst module) can then assign weighting given to these factors in the machine learning that can be supervised based on how strongly that characteristic has been found to match up to actual malicious sites in the training.

In another AI classifier to find potentially malicious indicators, the agent analyzer data analysis process in the analyzer module and/or cyber threat analyst module may cooperate with the process identifier classifier to identify all of the additional factors of i) are one or more processes running independently of other processes, ii) are the one or more processes running independent are recent to this network, and iii) are the one or more processes running independent connect to the endpoint, which the endpoint is a rare connection for this network, which are referenced and compared to one or more AI models trained with machine learning on the normal behavior of the pattern of life of the system.

The analyzer module cyber threat analyst module may use the agent analyzer data analysis process that detects a potentially malicious agent previously unknown to the system to start an investigation on one or more possible cyber threat hypotheses. The determination and output of this step is what are possible cyber threats that can include or be indicated by the identified abnormal behavior and/or identified suspicious activity identified by the agent analyzer data analysis process.

In an example, the cyber threat analyst module can use the agent analyzer data analysis process and the AI models trained on forming and investigating hypotheses on what are a possible set of cyber threats to use the machine learning and/or set scripts to aid in forming one or more hypotheses to support or refute each hypothesis. The cyber threat analyst module can cooperate with the AI models trained on forming and investigating hypotheses to form an initial set of possible hypotheses, which needs to be intelligently filtered down.

The cyber threat analyst module can be configured to use the one or more supervised machine learning models trained on
- agnostic examples of a past history of detection of a multitude of possible types of cyber threat hypotheses previously analyzed by human, who was a cyber security professional,
- a behavior and input of how a plurality of human cyber security analysts make a decision and analyze a risk level regarding and a probability of a potential cyber threat,
- steps to take to conduct an investigation start with anomaly via learning how expert humans tackle investigations into specific real and synthesized cyber threats and then the steps taken by the human cyber security professional to narrow down and identify a potential cyber threat, and
- what type of data and metrics that were helpful to further support or refute each of the types of cyber threats, in order to determine a likelihood of whether the abnormal behavior and/or suspicious activity is either i) malicious or ii) benign?

The cyber threat analyst module using AI models, scripts and/or rules based modules is configured to conduct initial investigations regarding the anomaly of interest, collected additional information to form a chain of potentially related/linked information under analysis and then form one or more hypotheses that could have this chain of information that is potentially related/link under analysis and then gather additional information in order to refute or support each of the one or more hypotheses.

Figure 8:
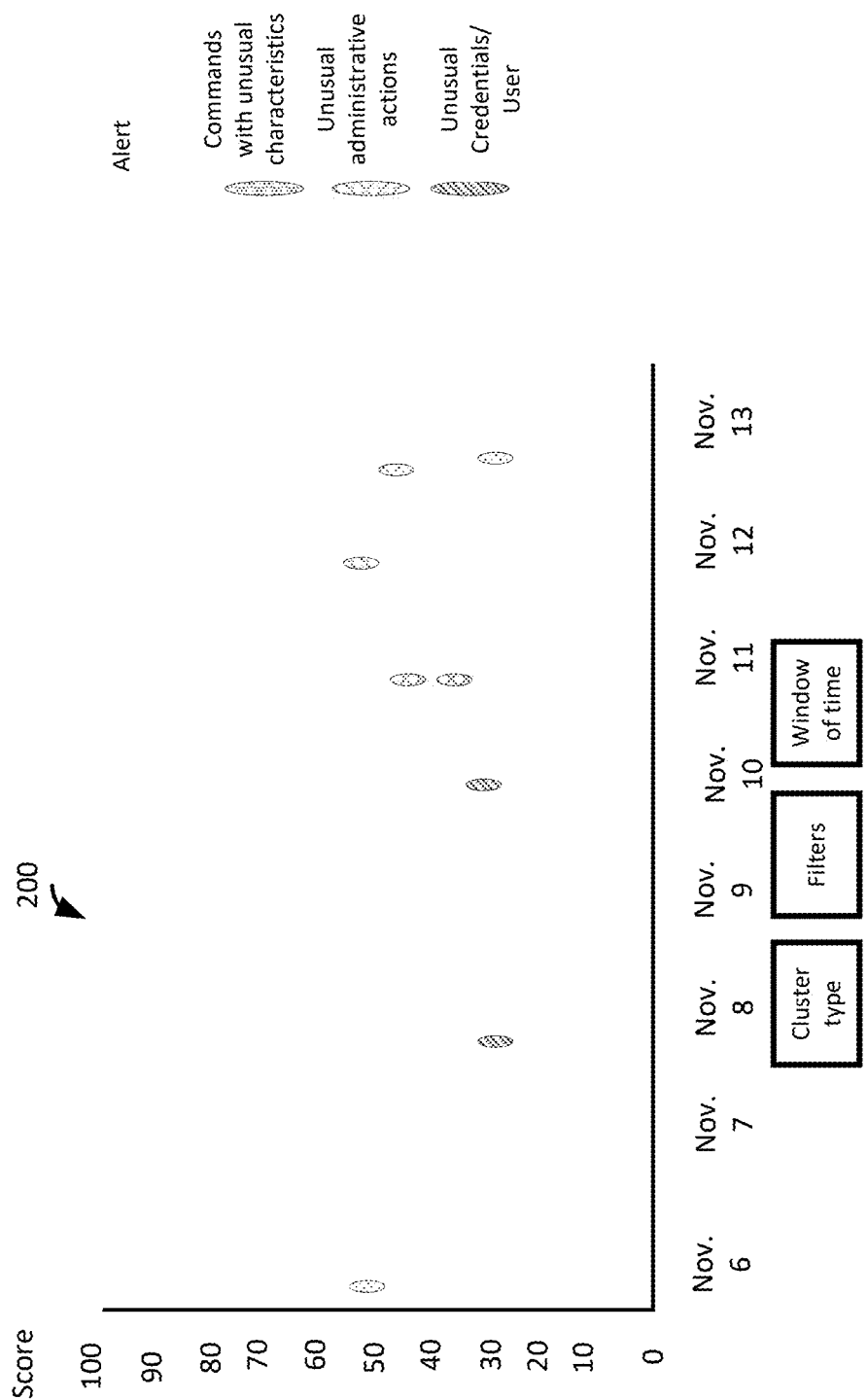
FIG. 8 illustrates a graph of an embodiment of an example chain of unusual behaviors for, in this example, the management plane activities and control plane activities deviating from the modelled normal behavior (e.g. a normal pattern of life) in connection with the rest of the network under analysis.

In an example, a behavioral pattern analysis of what are the unusual behaviors of the network/system/device/user under analysis by the machine learning models may be as follows. The coordinator module can tie the alerts, activities, and events from, in this example, the management plane to the alerts, activities, and events from the control plane. FIG. 8 illustrates a graph 220 of an embodiment of an example chain of unusual behaviors for, in this example, the management plane activities and control plane activities deviating from the modelled normal behavior (e.g., a normal pattern of life) in connection with the rest of the network under analysis. The cyber threat analysist module and/or analyzer module can cooperate with one or more machine learning models. The one or more machine learning models are trained and otherwise configured with mathematical algorithms to infer, for the cyber-threat analysis, 'what is possibly happening with the chain of distinct alerts, activities, and/or events, which came from the unusual pattern,' and then assign a threat risk associated with that distinct item of the chain of alerts and/or events forming the unusual pattern. The unusual pattern can be determined by examining initially what activities/events/alerts that do not fall within the window of what is the normal pattern of life for that network/system/device/user under analysis can be analysed to determine whether that activity is unusual or suspicious. A chain of related activity that can include both unusual activity and activity within a pattern of normal life for that entity can be formed and checked against individual cyber threat hypothesis to determine whether that pattern is indicative of a behavior of a malicious actor—human, program, or other threat. The cyber threat analyst module can go back and pull in some of the normal activities to help support or refute a possible hypothesis of whether that pattern is indicative of a behavior of a malicious actor. An example behavioral pattern included in the chain is shown in the graph over a time frame of, an example, 7 days. The cyber threat analyst module detects a chain of anomalous behavior of unusual administrative actions three times, unusual characteristics in control plane commands in the monitored system three times which seem to have some causal link to the unusual administrative actions. Likewise, twice unusual credentials attempted the unusual behavior of trying to gain access to sensitive areas or malicious IP addresses and the user associated with the unusual credentials trying unusual behavior has a causal link to at least one of those three control plane commands with unusual characteristics. Again, the cyber security appliance 100 can go back and pull in some of the normal activities to help support or refute a possible hypothesis of whether that pattern is indicative of a behavior of a malicious actor. The analyzer module can cooperate with one or more models trained on cyber threats and their behavior to try to determine if a potential cyber threat is causing these unusual behaviors. The cyber threat analyst module can put data and entities into 1) a directed graph and nodes in that graph that are overlapping or close in distance have a good possibility of being related in some manner, 2) a vector diagram, 3) relational database, and 4) other relational techniques that will at least be examined to assist in creating the chain of related activity connected by causal links, such as similar time, similar entity and/or type of entity involved, similar activity, etc., under analysis. If the pattern of behaviors under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber security appliance 100 is configurable in a user interface, by a user, enabling what type of automatic response actions, if any, the cyber security appliance 100 may take when different types of cyber threats, indicated by the pattern of behaviors under analysis, that are equal to or above a configurable level of threat posed by this malicious actor.

The chain of the individual alerts, activities, and events that form the pattern including one or more unusual or suspicious activities into a distinct item for cyber-threat analysis of that chain of distinct alerts, activities, and/or events. The cyber-threat module may reference the one or more machine learning models trained on, in this example, e-mail threats to identify similar characteristics from the individual alerts and/or events forming the distinct item made up of the chain of alerts and/or events forming the unusual pattern.

An Assessment of the Cyber Threat by the Modules in the Appliance Order to Determine an Appropriate Autonomous Actions from the Autonomous Response Module In the next step, the formatting module can generate an output such as a printed or electronic report with the relevant data. The formatting module can cooperate with both the analyzer module and the assessment module depending on what the user wants to be reported.

The formatting module is configured to format, present a rank for, and output one or more supported possible cyber threat hypotheses from the assessment module into a formalized report, from one or more report templates populated with the data for that incident.

The formatting module is configured to format, present a rank for, and output one or more detected cyber threats from the analyzer module or from the assessment module into a formalized report, from one or more report templates populated with the data for that incident. Many different types of formalized report templates exist to be populated with data and can be outputted in an easily understandable format for a human user's consumption.

The formalized report on the template is outputted for a human user's consumption in a medium of any of 1) printable report, 2) presented digitally on a user interface, 3) in a machine readable format for further use in machine-learning reinforcement and refinement, or 4) any combination of the three. The formatting module is further configured to generate a textual write up of an incident report in the formalized report for a wide range of breaches of normal behavior, used by the AI models trained with machine learning on the normal behavior of the system, based on analyzing previous reports with one or more models trained with machine learning on assessing and populating relevant data into the incident report corresponding to each possible cyber threat. The formatting module can generate a threat incident report in the formalized report from a multitude of a dynamic human-supplied and/or machine created templates corresponding to different types of cyber threats, each template corresponding to different types of cyber threats that vary in format, style, and standard fields in the multitude of templates. The formatting module can populate a given template with relevant data, graphs, or other information as appropriate in various specified fields, along with a ranking of a likelihood of whether that hypothesis cyber threat is supported and its threat severity level for each of the supported cyber threat hypotheses, and then output the formatted threat incident report with the ranking of each supported cyber threat hypothesis, which is presented digitally on the user interface and/or printed as the printable report.

In the next step, the assessment module with the AI classifiers, once armed with the knowledge that malicious activity is likely occurring/is associated with a given process from the analyzer module, then cooperates with the autonomous response module to take an autonomous action such as i) deny access in or out of the device or the network and/or ii) shutdown activities involving a detected malicious agent.

The autonomous response engine, rather than a human taking an action, can be configured to cause one or more rapid autonomous mitigation actions to be taken to counter the cyber threat. A user interface for the response module can program the autonomous response engine i) to merely make a suggested response to take to counter the cyber threat that will be presented on a display screen and/or sent by a notice to an administrator for explicit authorization when the cyber threat is detected or ii) to autonomously take a response to counter the cyber threat without a need for a human to approve the response when the cyber threat is detected. The autonomous response engine will then send a notice of the autonomous response as well as display the autonomous response taken on the display screen. Example autonomous responses may include cut off connections, shutdown devices, change the privileges of users, delete and remove malicious links in emails, slow down a transfer rate, and other autonomous actions against the devices and/or users. The autonomous response engine uses one or more Artificial Intelligence models that are configured to intelligently work with other third-party defense systems in that customer's network against threats. The autonomous response engine can send its own protocol commands to devices and/or take actions on its own. In addition, the autonomous response engine uses the one or more Artificial Intelligence models to orchestrate with other third-party defense systems to create a unified defense response against a detected threat within or external to that customer's network. The autonomous response engine can be an autonomous self-learning response coordinator that is trained specifically to control and reconfigure the actions of traditional legacy computer defenses (e.g. firewalls, switches, proxy servers, etc.) to contain threats propagated by, or enabled by, networks and the internet. The cyber threat module can cooperate with the autonomous response engine to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

The trigger module, analyzer module, assessment module, and formatting module cooperate to improve the analysis and formalized report generation with less repetition to consume CPU cycles with greater efficiency than humans repetitively going through these steps and re-duplicating steps to filter and rank the one or more supported possible cyber threat hypotheses from the possible set of cyber threat hypotheses.

The cyber security appliance 100 builds and maintains a dynamic, ever-changing model of the 'normal behavior' of each user and machine within the system. The approach is based on Bayesian mathematics, and monitors all interactions, events and communications within the network.

The model of the normal behaviors for an entity in the network under analysis is used as a moving benchmark, allowing the cyber security appliance 100 to spot behavior in the system, under analysis, that seems to fall outside of this normal pattern of life, and flags this behavior as anomalous, requiring further investigation and/or autonomous action.

The cyber security appliance 100's unsupervised machine learning methods do not require training data with predefined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network—even when it does not know what it is looking for.

The cyber security appliance 100 can use a Recursive Bayesian Estimation. To combine these multiple analyzes of different measures of network behavior to generate a single overall/comprehensive picture of the state of each device, the cyber security appliance 100 takes advantage of the power of Recursive Bayesian Estimation (RBE) via an implementation of the Bayes filter.

Using RBE, the cyber security appliance 100's AI models are able to constantly adapt themselves, in a computationally efficient manner, as new information becomes available to the system. The cyber security appliance 100's AI models continually recalculate threat levels in the light of new evidence, identifying changing attack behaviors where conventional signature based methods fall down.

Training a model can be accomplished by having the model learn good values for all of the weights and the bias for labeled examples created by the system, and in this case; starting with no labels initially. A goal of the training of the model can be to find a set of weights and biases that have low loss, on average, across all examples.

The AI classifier can receive supervised machine learning with a labeled data set to learn to perform their task as discussed herein. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

The method and system shown in the Figures and discussed in the text herein can be coded to be performed, at least in part, by one or more processing components with any portions of software stored in an executable format on a computer readable medium. Thus, any portions of the method, apparatus and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

Computing Devices

Figure 9:
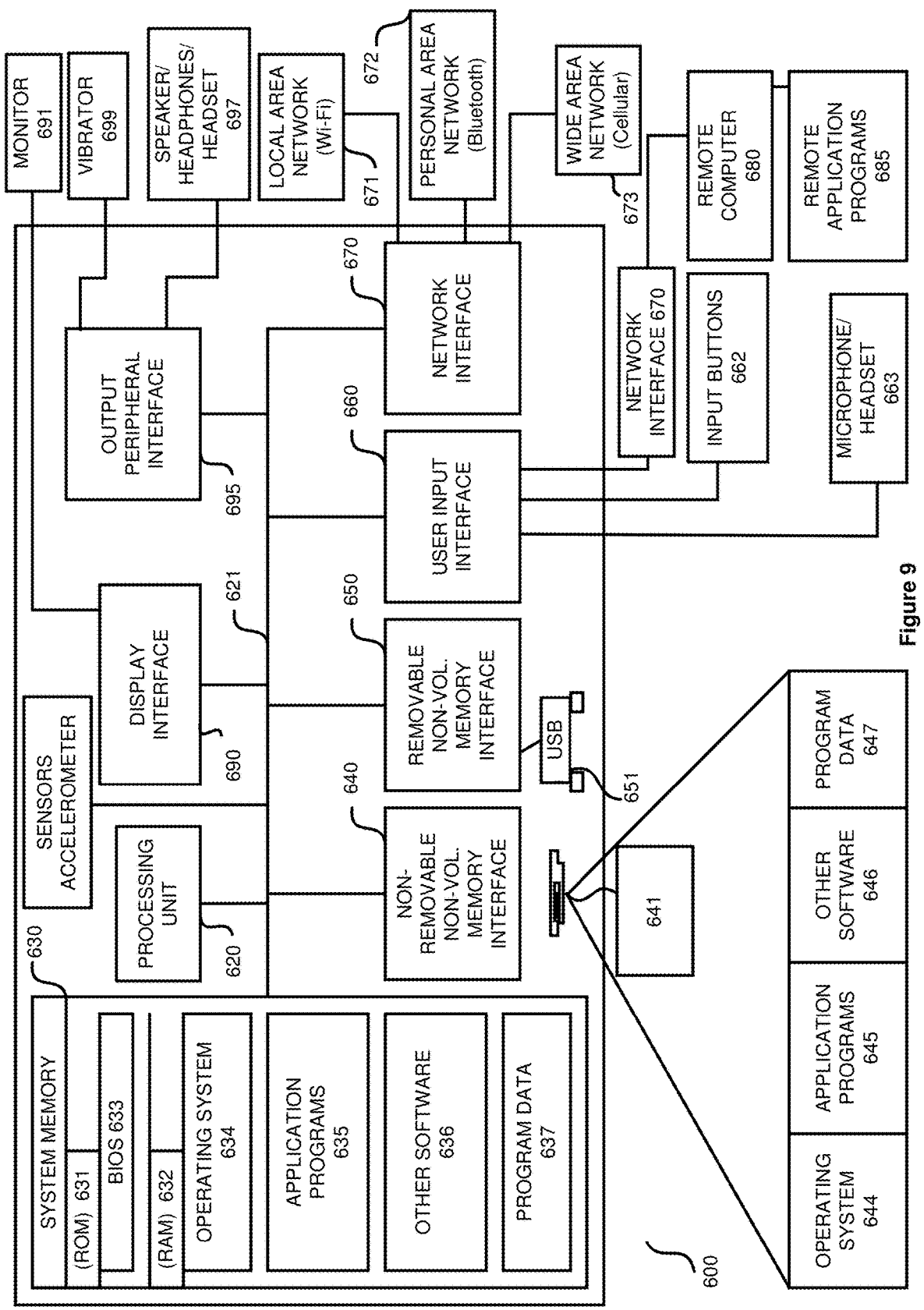
FIG. 9 illustrates a block diagram of an embodiment of one or more computing devices that can be a part of the cyber security system including the cyber security appliance and other components of the current design discussed herein.

FIG. 9 illustrates a block diagram of an embodiment of one or more computing devices that can be a part of the cyber security system including the cyber security appliance and other components of the current design discussed herein.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 602. Transitory media such as wireless channels are not included in the machine-readable media. Machine-readable media typically embody computer readable instructions, data structures, and other executable software.

In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used. It should be noted that the present design can be carried out on a single computing device or on a distributed system in which different portions of the present design are carried out on different parts of the distributed computing system.

Note, an application described herein includes but is not limited to software applications, mobile applications, and programs, routines, objects, widgets, plug-ins that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both. Many functions performed by electronic hardware components can be duplicated by software emulation. Thus, a software program written to accomplish those same functions can emulate the functionality of the hardware components in input-output circuitry.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An apparatus, comprising:
one or more self-learning models configured to use unsupervised machine learning algorithms to model a control plane in a telecommunications network via modelling a normal behavior of communications and activities in the control plane in the telecommunications network,
an assessment module configured to cooperate with the self-learning models that use the unsupervised machine learning algorithms to model the normal behavior of the communications and activities in the control plane in the telecommunications network in order to assess deviations in the control plane's normal behavior to protect the telecommunications network from a cyber threat,
where the self-learning models are configured to use the unsupervised machine learning algorithms to model the normal behavior of the communications and activities in the control plane in the telecommunications network in order to self-learn with the unsupervised machine learning algorithms over time of an operation of the telecommunications network to assist in determining what is normal and what is abnormal,
where an AI classifier in a control plane module is configured to at least understand a format of packets formatted in one or more telecom network protocols including control plane protocols, where the control plane module is configured to receive information from and send information to sensors located within the telecommunications network to monitor and collect information, via at least performing a deep packet inspection on telecom packets in the telecommunications network, where the control plane module is configured to cooperate with the assessment module and the one or more self-learning models modeling normal behavior to perform AI anomaly detection on the communications in the control plane to detect the cyber threat, and
where any software instructions for the self-learning models, the control plane module, and the assessment module are stored in one or more computer readable mediums in an executable format to be executed by one or more processors.

2. The apparatus of claim 1, further comprising:
where the one or more self-learning models are configured to also use unsupervised machine learning algorithms to model a normal behavior of communications and activities in a management plane in the telecommunications network, and the assessment module is further configured to assess deviations in the management plane's normal behavior in the telecommunications network to protect the telecommunications network from the cyber threat.

3. The apparatus of claim 2, where an autonomous response module configured to work with the assessment module when the cyber threat is detected and autonomously take actions to mitigate the cyber threat by at least one of 1) disrupting a telecom connection being used by the cyber threat and 2) restricting one or more components affected by the cyber threat to limit i) telecom traffic out of those components and activities performed by the components to their normal behavioral activities by blocking specific activities and communications that show up as abnormal for that component based on an understanding of what is normal indicated by the self-learning models that use unsupervised machine learning algorithms to model the normal behavior of the communications and activities in the control plane and/or in the management plane.

4. The apparatus of claim 1, where the AI classifier in the control plane module is configured to perform a deep packet inspection on telecom packets in the telecommunications network to assist in determining a telecom packet's intention and other information about the packet.

5. The apparatus of claim 1, where a second AI classifier in a management plane module is configured to at least understand the format of packets formatted in telecom network protocols including management plane protocols, where the management plane module is configured to receive information from and send information to sensors located within the telecommunications network to monitor and collect information via at least performing a deep packet inspection on telecom packets in the telecommunications network, where the AI classifier in the management plane module is configured to cooperate with the assessment module and the one or more AI models modeling normal behavior to perform AI anomaly detection on communications in the management plane to detect the cyber threat, and where the AI classifier in the management plane module is configured to perform the deep packet inspection on the telecom packets to assist in determining a telecom packet's intention and other information about the telecom packet including routing information.

6. The apparatus of claim 1, where at least of one of the control plane module and a management module is configured to receive information from and send information to sensors located both within components of the telecommunications network and components located outside of a control of the telecommunications network.

7. The apparatus of claim 1, where the control plane module is configured to receive information from and send information to a software agent acting as a sensor located outside of a control of the telecommunications network in a container-orchestration system operated by a third party to monitor communications and activities of two or more applications occurring in a same pod of the container-orchestration system.

8. The apparatus of claim 1, where the control plane module is configured to receive information from and send information to a software agent acting as a sensor located outside of a control of the telecommunications network in a container-orchestration system to monitor at least communications occurring between two or more applications located in a same pod of the container-orchestration system.

9. A non-transitory computer readable medium to store instructions and data in an executable state, which when executed by one or more processor is configured to perform operations, comprising:
  using one or more self-learning models that use unsupervised machine learning algorithms to model a control plane in a telecommunications network via modelling a normal behavior of communications and activities in the control plane in the telecommunications network,
  assessing the communications and activities in the control plane in the telecommunications network in order to determine deviations in the control plane's normal behavior to protect the telecommunications network from a cyber threat,
  modelling the normal behavior of the communications and activities in the control plane in the telecommunications network over time of an operation of the telecommunications network to determine what is normal and what is abnormal, and
  using an AI classifier in a control plane module to at least understand a format of packets formatted in one or more telecom network protocols including control plane protocols, where the control plane module is configured to receive information from and send information to sensors located within the telecommunications network to monitor and collect information, via at least performing a deep packet inspection on telecom packets in the telecommunications network, where the control plane module is configured to cooperate with the assessment module and the one or more AI models modeling normal behavior to perform AI anomaly detection on the control plane communications to detect the cyber threat.

10. A method for protecting against a cyber threat in a telecommunications network, comprising:
  using one or more self-learning models that use unsupervised machine learning algorithms to model a control plane in the telecommunications network via modelling a normal behavior of communications and activities in the control plane in the telecommunications network,
  using an assessment module to cooperate with the self-learning models that use the unsupervised machine learning algorithms to model the normal behavior of the communications and activities in the control plane in the telecommunications network in order to assess deviations in the control plane's normal behavior to protect the telecommunications network from the cyber threat,
  where the self-learning models are configured to use the unsupervised machine learning algorithms to model the normal behavior of the communications and activities in the control plane in the telecommunications network and self-learn with the unsupervised machine learning algorithms over time of an operation of the telecommunications network to determine what is normal and what is abnormal,
  using an AI classifier in a management plane module to at least understand a format of packets formatted in telecom network protocols including management plane protocols,
  using the management plane module to receive information from and send information to sensors located within the telecommunications network to monitor and collect information via at least performing a deep packet inspection on telecom packets in the telecommunications network, and
  using the AI classifier in the management plane module to cooperate with the assessment module and the one or more AI models modeling normal behavior to perform AI anomaly detection on the communications in the management plane to detect the cyber threat, and where the AI classifier in the management plane module is configured to perform the deep packet inspection on the telecom packets to determine a telecom packet's intention and other information about the telecom packet including routing information.

11. The method of claim 10, further comprising:
  using the one or more self-learning models that use the unsupervised machine learning algorithms to model the normal behavior of communications and activities in a management plane in the telecommunications network, and
  using the assessment module to assess deviations in the management plane's normal behavior in the telecommunications network to protect the telecommunications network from the cyber threat.

12. The method of claim 11, further comprising:
  using an autonomous response module to work with the assessment module when the cyber threat is detected and autonomously take actions to mitigate the cyber threat by at least one of 1) disrupting a telecom connection being used by the cyber threat and 2) restricting one or more components affected by the cyber threat to limit i) telecom traffic out of those components and activities performed by the components to their normal behavioral activities by blocking specific activities and communications that show up as abnormal for that component based on an understanding of what is normal indicated by the self-learning models that use the unsupervised machine learning algorithms to model the normal behavior of the communications and activities in the control plane and/or in the management plane.

13. The method of claim 10, further comprising:
  using the AI classifier to perform the deep packet inspection on telecom packets in the telecommunications network to determine a telecom packet's intention and other information about the packet.

14. The method of claim 10, further comprising:
  using a control plane module to receive information from and send information to sensors located both within components of the telecommunications network and components located outside of a control of the telecommunications network.

15. The method of claim 10, further comprising:

using a control plane module to receive information from and send information to a software agent acting as a sensor located outside of a control of the telecommunications network in a container-orchestration system operated by a third party to monitor communications and activities of two or more applications occurring in a same pod of the container-orchestration system.

16. The method of claim 10, further comprising:

using a control plane module to receive information from and send information to a software agent acting as a sensor located outside of a control of the telecommunications network in a container-orchestration system to monitor at least communications occurring between two or more applications located in a same pod of the container-orchestration system.

17. The method of claim 10, further comprising:

using a second AI classifier in a control plane module to at least understand a format of packets formatted in one or more telecom network protocols including control plane protocols, using the control plane module to receive information from and send information to sensors located within the telecommunications network to monitor and collect information, via at least performing a deep packet inspection on telecom packets in the telecommunications network, and using the control plane module to cooperate with the assessment module and the one or more AI models modeling normal behavior to perform AI anomaly detection on the control plane communications to detect the cyber threat.

18. A non-transitory computer readable medium to store instructions and data in an executable state, which when executed by one or more processor is configured to perform the method of claim 10.

* * * * *